(12) United States Patent
Smith

(10) Patent No.: US 7,411,493 B2
(45) Date of Patent: *Aug. 12, 2008

(54) USER-CENTRIC EVENT REPORTING

(75) Inventor: Michael R. Smith, Wichita, KS (US)

(73) Assignee: User-Centric IP, L.P., State College, PA (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/227,483

(22) Filed: Sep. 16, 2005

(65) Prior Publication Data

US 2006/0015254 A1 Jan. 19, 2006

Related U.S. Application Data

(63) Continuation-in-part of application No. 11/024,979, filed on Dec. 30, 2004, now Pat. No. 7,248,159, which is a continuation-in-part of application No. 10/969,915, filed on Oct. 22, 2004, now Pat. No. 7,089,116, which is a continuation of application No. 10/386,437, filed on Mar. 13, 2003, now Pat. No. 6,845,324.

(51) Int. Cl.
G08B 1/08 (2006.01)
G06F 15/00 (2006.01)
B60Q 1/00 (2006.01)

(52) U.S. Cl. .............. 340/539.18; 340/539.11; 340/539.12

(58) Field of Classification Search ............ 340/538.18, 340/539.18
See application file for complete search history.

(56) References Cited

U.S. PATENT DOCUMENTS

| | | | |
|---|---|---|---|
| 5,355,140 A | 10/1994 | Slavin et al. | |
| 5,508,930 A | 4/1996 | Smith et al. | |
| 5,628,050 A | 5/1997 | McGraw et al. | |
| 5,699,056 A | 12/1997 | Yoshida | |
| 5,771,001 A * | 6/1998 | Cobb ................. | 340/573.1 |
| 5,848,373 A * | 12/1998 | DeLorme et al. ........ | 701/200 |
| 5,867,110 A | 2/1999 | Naito et al. | |

(Continued)

FOREIGN PATENT DOCUMENTS

CA 2158335 3/1996

(Continued)

OTHER PUBLICATIONS

Maptech Plcket Navigator, printed from http://www.maptech.com/products/PocketNavigator/index.cfm on May 29, 2003, 19 pages.

(Continued)

*Primary Examiner*—Donnie L Crosland
(74) *Attorney, Agent, or Firm*—Banner & Witcoff, Ltd.

(57) ABSTRACT

The invention provides a system and method for reporting hazard and event information from a mobile unit, and using that information to warn a user of an event or future hazard with reference to the mobile unit's location and/or intended direction of travel. Users may wirelessly report events or hazards to a central server in an event center by sending data to the event center via a wireless communications network. Secondary information may be included, based on the selected event type, along with images, audio, and video of the event. The event center stores event information, including event locations based on the locations of the transmitting mobile units, and makes this information available to allow other users to respond to the hazard or event.

30 Claims, 18 Drawing Sheets

U.S. PATENT DOCUMENTS

| | | | |
|---|---|---|---|
| 5,914,675 | A | 6/1999 | Tognazzini |
| 5,959,567 | A | 9/1999 | Wolfson et al. |
| 5,991,687 | A | 11/1999 | Hale et al. |
| 6,009,374 | A | 12/1999 | Urahashi |
| 6,018,699 | A | 1/2000 | Baron, Sr. et al. |
| 6,031,455 | A | 2/2000 | Grube et al. |
| 6,084,510 | A | 7/2000 | Lemelson et al. |
| 6,112,074 | A | 8/2000 | Pinder |
| 6,125,328 | A | 9/2000 | Baron et al. |
| 6,148,261 | A * | 11/2000 | Obradovich et al. ......... 701/208 |
| 6,154,699 | A | 11/2000 | Williams |
| 6,167,255 | A | 12/2000 | Kennedy, III et al. |
| 6,198,390 | B1 | 3/2001 | Schlager et al. |
| 6,199,045 | B1 | 3/2001 | Giniger et al. |
| 6,240,365 | B1 | 5/2001 | Bunn |
| 6,252,544 | B1 | 6/2001 | Hoffberg |
| 6,255,953 | B1 | 7/2001 | Barber |
| 6,289,331 | B1 | 9/2001 | Pedersen et al. |
| 6,295,001 | B1 | 9/2001 | Barber |
| 6,304,816 | B1 | 10/2001 | Berstis |
| 6,400,265 | B1 * | 6/2002 | Saylor et al. ................ 340/531 |
| 6,429,812 | B1 | 8/2002 | Hoffberg |
| 6,505,123 | B1 | 1/2003 | Root et al. |
| 6,542,825 | B2 | 4/2003 | Jones et al. |
| 6,646,559 | B2 | 11/2003 | Smith |
| 6,754,585 | B2 | 6/2004 | Root et al. |
| 6,826,481 | B2 | 11/2004 | Root et al. |
| 6,836,730 | B2 | 12/2004 | Root et al. |
| 6,845,324 | B2 * | 1/2005 | Smith ............................ 702/3 |
| 6,941,126 | B1 | 9/2005 | Jordan, Jr. |
| 6,980,909 | B2 | 12/2005 | Root et al. |
| 6,985,813 | B2 | 1/2006 | Root et al. |
| 6,988,037 | B2 | 1/2006 | Root et al. |
| 7,024,310 | B2 | 4/2006 | Root et al. |
| 2005/0050008 | A1 | 3/2005 | Root et al. |
| 2006/0080039 | A1 | 4/2006 | Root et al. |
| 2006/0161469 | A1 | 7/2006 | Root et al. |

OTHER PUBLICATIONS

Maptech Outdoor Navigator, printed from http://www.maptech.com/products/OutdoorNavigator/index.cfm on May 29, 2003, 8 pages.

Teletype GPS, WorldNavigator, 2002, 2 pages.

TeleType GPS—Street Level Maps, printed from http://www.teletype.com/pages/gps/street.html printed on May 29, 2003, 4 pages.

Microsoft Streets & Trips 2003, printed from http://www.microsoft.com/streets printed on May 29, 2003, 11 pages.

Navigation Solutions, printed from http://hertzneverlost.com on May 29, 2003, 7 pages.

Control Vision, printed from http://www.anywheremap.com on May 29, 2003, 6 pages.

* cited by examiner

| | $w_0$ | $w_0$ | $w_0$ | $w_{10}$ | $w_{20}$ | $w_{30}$ | |
|---|---|---|---|---|---|---|---|
| | | $w_0$ | $w_0$ | $w_{10}$ | $w_{20}$ | $w_{30}$ | |
| $v_{30}$ | $v_{20}$ | $v_{10}$ | $v_0$ | | | | |
| | $w_0$ | $w_0$ | $w_0$ | $w_{10}$ | $w_{20}$ | $w_{30}$ | |
| | $w_0$ | $w_0$ | $w_0$ | $w_{10}$ | $w_{20}$ | $w_{30}$ | |

FIG. 3D

| | | | $w_0$ | $w_0$ | $w_0$ | $w_{10}$ | $w_{20}$ | $w_{30}$ |
|---|---|---|---|---|---|---|---|---|
| | | | | $w_0$ | $w_0$ | $w_{10}$ | $w_{20}$ | $w_{30}$ |
| $v_{30}$ | $v_{20}$ | $v_{10}$ | $v_0$ | | | | | |
| | | | $w_0$ | $w_0$ | $w_0$ | $w_{10}$ | $w_{20}$ | $w_{30}$ |
| | | | $w_0$ | $w_0$ | $w_0$ | $w_{10}$ | $w_{20}$ | $w_{30}$ |

FIG. 3E

| | | | | | | | |
|---|---|---|---|---|---|---|---|
| | | | $w_0$ | $w_0$ | $w_0$ | $w_{10}$ | $w_{20}$ |
| $v_{20}$ | $v_{10}$ | $v_0$ | | $w_0$ | $w_0$ | $w_{10}$ | $w_{20}$ |
| | | | $w_0$ | $w_0$ | $w_0$ | $w_{10}$ | $w_{20}$ |
| | | | $w_0$ | $w_0$ | $w_0$ | $w_{10}$ | $w_{20}$ |

FIG. 3F

|  |  |  |  |  |  |  |  |
|---|---|---|---|---|---|---|---|
|  |  | $w_0$ | $w_{10}$ | $w_{20}$ |  |  |  |
|  |  | $w_0$ | $w_{10}$ $v_{30}$ | $w_{20}$ $v_{20}$ |  |  |  |
|  |  | $w_0$ | $w_0$ | $w_0$ | $v_{10}$ |  |  |
|  |  |  |  |  |  | $v_0$ |  |

FIG. 4A

|  |  |  |  |  |  |  |  |
|---|---|---|---|---|---|---|---|
|  |  | $w_0$ | $w_{10}$ | $w_{20}$ |  |  |  |
|  |  | $w_0$ $v_{30}$ | $w_{10}$ $v_{20}$ | $w_{20}$ $v_{10}$ |  |  |  |
|  |  | $w_0$ | $w_0$ | $w_0$ | $w_{10}$ $v_{10}$ |  |  |
|  |  |  |  |  |  |  |  |

FIG. 4B

|  |  |  |  |  |  |  |  |
|---|---|---|---|---|---|---|---|
|  |  | $w_0$ | $w_0$ | $w_{10}$ | $w_{20}$ |  |  |
|  |  | $w_0$ | $w_{10}$ $v_{10}$ | $w_{20}$ $v_0$ | $w_0$ |  |  |
|  |  | $v_{20}$ |  |  |  |  |  |
|  | $v_{30}$ |  |  |  |  |  |  |

FIG. 4C

USER-CENTRIC EVENT REPORTING

CROSS-REFERENCE TO RELATED CASES

The present application is a continuation-in-part of application Ser. No. 11/024,979, filed Dec. 30, 2004, entitled User-Centric Event Reporting, now U. S. Pat. No. 7,248,159,issued Jul. 24, 2007 which is a continuation-in-part of application Ser. No, 10/969,915, filed Oct. 22, 2004, entitled User-Centric Event Reporting, now U.S. Pat. No. 7,089,116,issued Aug. 8, 2006 which is a continuation of application Ser. No. 10/386,437, filed Mar. 13, 2003, entitled Rotating Map And User-Centric Weather Prediction, now U.S. Pat. No. 6,845,324 issued Jan. 18, 2005.

FIELD OF THE INVENTION

The present invention relates generally to hazard and event warning systems. More particularly, the invention provides a method and apparatus for receiving event and/or hazard information by a portable electronic device and using that information to warn a device operator of a future event or hazard with respect to the specific device's location, and also provide the device operator with the ability to report event or hazard information to a server for further distribution.

BACKGROUND OF THE INVENTION

Vehicle operators, such as automobile drivers, frequently tune to radio stations while traveling in order to obtain weather forecast information. Such forecasts generally cover a large geographic area, such as an entire county or a multi-county region, and can provide some indication to the vehicle operator of likely weather trouble, such as a flash flood or tornado. Because they cover such large areas, however, generalized weather forecasts may cause wasteful evasive action by drivers not realistically at risk. For example, if the National Weather Service issues a flash flood warning for an entire county, all drivers in the county may need to heed the warning, even if the flood areas make up only a small part of the county.

Similarly, if a sudden snowstorm approaches from the west, a large number of drivers may take evasive action based on a general weather forecast for cities in the path of the approaching storm. Depending on where the drivers are relative to the weather hazard, some drivers may feel the effects of the storm shortly after the warning, while others may not be in the path of the storm for 10, 20, or even 30 minutes. Providing drivers with more accurate and vehicle-specific weather forecasts could result in substantial time and energy savings. For example, if a driver is heading West and is projected to arrive at his destination within 20 minutes, it would be helpful to know that the storm will not arrive at the intended destination for another 30 minutes. Such a system would be particularly useful for fleets of commercial trucks or buses, for example, particularly since such vehicles may be more susceptible to causing injury or property damage during severe weather events (e.g., snow, ice storms, and the like).

Various position-sensitive automated vehicle systems have been proposed. For example, U.S. Pat. No. 5,991,687 ("System and Method for Communicating Information Related to a Geographic Area") describes a system for displaying the location of a vehicle to the vehicle operator, along with other information such as a weather map. However, the system cannot provide the sort of information that would permit a vehicle operator to determine whether he or she was likely to encounter a weather hazard and for how long such a hazard might last.

Another system, disclosed in U.S. Pat. No. 6,009,374 ("Apparatus for and Method of Controlling Vehicular Systems While Traveling"), assists a vehicle operator by automatically controlling the vehicle in response to various detected conditions and an intended travel position. One variation of the system extracts current weather information and uses the information to sound an alarm. The system, however, does not provide predicted weather information to the vehicle operator; it does not provide hazard duration information; and it does not provide weather information tailored to the particular vehicle. Consequently, the system does not solve the aforementioned problems.

Yet another system, described in U.S. Pat. No. 6,018,699 ("Systems and Methods for Distributing Real-Time Site Specific Weather Information"), reports weather forecasts through the use of storm profiles that are transmitted to remote units at dispersed geographic sites. The remote units are stationary, and storm profiles are transmitted to remote units based on their geographic location. The system has no application for use with moving vehicles, as it cannot receive information concerning the mobile location of such vehicles.

In addition to the above, because we live in an increasingly mobile society, individuals are more likely to get lost or disoriented in unfamiliar territory and have their safety threatened by severe weather conditions. Specifically, weather is a factor in a high percentage of transportation accidents, including commercial aviation (26.8%), general aviation (20%), boating (11.2% of accidents; 14.8% of accidents involving fatalities), automobiles (16.3%), and recreational vehicles (10%). While some of these accidents were due to operator error, others are due to the driver, pilot or operator of the vehicle traveling into an area of hazardous weather beyond his or her skill level or the capability of his or her vehicle to handle the inclement weather. Current terrestrial navigation and weather systems suffer from several deficiencies: 1) receipt of a warning depends on a user being tuned to a radio station in the affected area that actually broadcasts storm warnings (in addition, many radio stations no longer broadcast warnings outside of the immediate area in which they are located); 2) warnings, e.g., NWR tone alerts, are only broadcast once—if the user misses the warning, the user will not be notified of the impending inclement conditions; and 3) if the user is not tuned to the correct radio station at the time of the warning, the user will miss the warning.

Assuming that the user actually hears the warning, the National Weather Service issues storm warnings by county. Thus, in order for the warning to be meaningful to the user, he or she would necessarily need to be familiar with the county layout of the area. However, when traveling, few people know which county they are currently in or which county they are approaching, other than when in or around their own home county. In addition, when the National Weather Service indicates that a storm is "near Jonesburg, moving northeast at 40 mph," it assumes a user knows the location of Jonesburg, the spatial relationship between Jonesburg and the user's location (which may be changing if the user is in motion) and is able to integrate the motion of the storm with the motion of the user to know if the user is actually threatened. However, most people are not cognizant of this information.

Previously, the meteorological science and the positioning and communications technology required to get site specific information for a given vehicle or user and the hazards it could face did not exist. However, a number of navigation products for aviation, marine and terrestrial use have recently been introduced, including TeleType World Navigator, MapTech Pocket Navigator, MapTech Outdoor Navigator, TeleType GPS Companion, Microsoft Streets & Trips, Hertz NeverLost, ControlVision AnywhereMap/AnywhereWx.

In each of these products (except AnywhereWx), the user map orientation is fixed with a moving icon representing the vehicle (automobile or boat) in motion. This approach has a number of shortcomings, including ease with which a user can still get lost, and inability to adapt to non-fixed range conditions. That is, users who cannot easily read and interpret maps may still get lost. For example, if a map is always oriented with north at the top and a right turn is indicated, to someone traveling south the turn is actually to the left (on the map). A display that rotates to keep the route of travel at the top of the display would allow turns and other maneuvers to be synchronized with the route of travel (i.e., left on the display is the direction the driver actually turns).

Fixed ranges may be appropriate when a map display is used for navigation only, but fixed ranges are not appropriate when a device is used to anticipate hazardous conditions. For example, exits on the Kansas Turnpike can be as much as 30 miles apart. A user traveling westbound at Topeka using a navigation device with a fixed-range map display set on a range of ten miles may go past the last exit and drive into a dangerous weather situation 15 miles to the west. There would be no way for the user to avoid or escape on this limited-access rural highway.

Some known aviation systems rotate a display map with the route of flight and changes in aircraft direction. However, these are relatively large units intended to be fixed inside the cockpit of an aircraft. There is one known aviation display system that is portable, AnywhereMap by Control Vision. AnywhereMap uses a GPS signal to rotate its display to conform to the direction of travel of the AnywhereMap device. The map moves underneath a fixed icon or point on the display to indicate the location of the device above the map. There is a supplement to AnywhereMap called AnywhereWx in which current radar and other weather information is added. No forecast information is available on AnywhereWx, nor does it have the capability of changing ranges or otherwise notifying a pilot or user of hazardous conditions in the travel path. There is no technology to predict when the path of hazardous weather and a moving user will intersect.

Hertz's Neverlost in-car navigation system also changes orientation as the automobile changes direction. However, there is no weather information on the Neverlost system. In addition, because the Neverlost system is designed to assist automobile renters who are generally unfamiliar with the locale in which they have rented the car, the close-up fixed map range is inappropriate for meteorological display and warning purposes.

In addition to the above limitations, known systems typically provide, at most, only location information regarding the mobile device. That is, the mobile device cannot be used to report information, other than location information, from the mobile device to a second party, e.g., another user or a central server.

The aforementioned problems indicate there is a need for the solutions provided by the present invention.

BRIEF SUMMARY OF THE INVENTION

The invention provides a system and method for receiving event or hazard information by a mobile data processing device and using that information to warn a user of the device of a future hazard or life threatening event with reference to the user's and/or device's intended direction of travel. In one embodiment, an event center maintains a database and display of hazards (current and predicted) across a large area, such as the entire United States and adjacent coastal waters. The event center also receives information regarding the location of each of a plurality of mobile data processing devices, such as PDA's, cell phones, laptop computers, automobiles or a fleet of commercial trucks.

A hazard location algorithm compares a forecast location of each device with a forecast hazard and transmits a warning to each device that is predicted to encounter the hazard. The warning can take the form of text, audio, and/or a visual display indicating, for example, that the device will likely encounter heavy snow in approximately 30 minutes, and that the heavy snow will last for approximately 45 minutes. As the device moves, its actual position is updated in the event center, and a revised warning is transmitted to the device. The warning can be conveyed to the vehicle in terms of mile posts, railroad stations, waypoints, Very High Frequency Omnidirectional Range Stations (VORs), latitude/longitude, etc.

In some embodiments, the event forecast warning system may use a rotating map to display information to a user of the system. The system display displays a geographic map including an icon indicating a present location of the system on the geographic map, based on received location information. The display also includes forecast hazard information. Control logic of the system rotates the geographic map displayed, based on the received location information, so that a direction of travel of the system maintains constant with respect to a predetermined position on a housing of the display (e.g., the top of the display).

In yet other embodiments there is a method for providing information regarding an observed event, receiving an event type as user input into a mobile data processing device, where the event type is selected from a constrained set of event types displayed on the mobile data processing device. The mobile data processing device determines an event location in proximity to the mobile data processing device, and wirelessly sends to an event center, the event type and the determined event location. The location can be determined in various ways, including user input, automatic detection, or reading location information from a second device such as an RFID tag.

The event center may receive from a mobile data processing device, computer readable data comprising information corresponding to an event visually observed by a user of the mobile data processing device, wherein the data includes a type of event, and includes a location of the event based on the location of the mobile data processing device. The type of event can be selected from a constrained set of event types. The event center may then display on a display device a warning based on the received computer readable data.

In some embodiments, based on the event initially reported, the device may be used to report subsequent related information, or secondary information, regarding the event dependent on the type of event initially selected by the user of the mobile data processing device. E.g., where the event type identifies a medical condition, it is useful to know such information including the afflicted person's blood pressure, or to relay EKG information. The mobile data processing device may receive an input value for a type of secondary information associated with the selected event type, and wirelessly send to an event center the input value for the secondary information. The event center may optionally return a confirmation message to the mobile data processing device.

The secondary information may be determined in various ways according to various embodiments of the invention. For example, the types of secondary information associated with various event types may be stored in a lookup table, database, or other storage in the mobile data processing device. Alternatively, the associated type of secondary information may be provided by the event center. An event type may have multiple types of secondary information associated with it. Secondary information may include numerical values (e.g., a blood pressure), binary data (e.g., an EKG), textual information, visual images or photos, audio recordings, and the like.

The event center may incorporate any secondary information associated with a hazard or event into the messages or warnings displayed on the display devices. For example, images, audio, or video recorded of an event may be displayed by the display device along with the event type and location. In one embodiment, the image of an event or hazard is displayed on a map at a point corresponding to the location where the event or hazard was reported. Users of interactive display devices such as computers may customize the display graphical user interface so that only the desired information is included in the displayed event notification. The notification may be moved around on the display screen, and the event may be minimized by the user. Alternatively, an event may be selected and any secondary information associated with the event (e.g. video clips, images, sounds, text data, etc.) may be shown on the display screen.

BRIEF DESCRIPTION OF THE DRAWINGS

FIG. 3A shows a current weather grid including current and forecast weather hazards, and current and forecast vehicle locations.

FIG. 3B shows the weather grid of FIG. 3A after ten minutes have elapsed.

FIG. 3C shows the weather grid of FIG. 3A after twenty minutes have elapsed.

FIG. 3D shows the weather grid of FIG. 3A after thirty minutes have elapsed.

FIG. 3E shows the weather grid of FIG. 3A after forty minutes have elapsed.

FIG. 3F shows the weather grid of FIG. 3A after fifty minutes have elapsed.

FIG. 4A shows a current weather grid including current and forecast weather hazards, and current and forecast vehicle locations.

FIG. 4B shows the weather grid of FIG. 4A after ten minutes have elapsed.

FIG. 4C shows the weather grid of FIG. 4A after twenty minutes have elapsed.

DETAILED DESCRIPTION OF THE INVENTION

Figure 1:
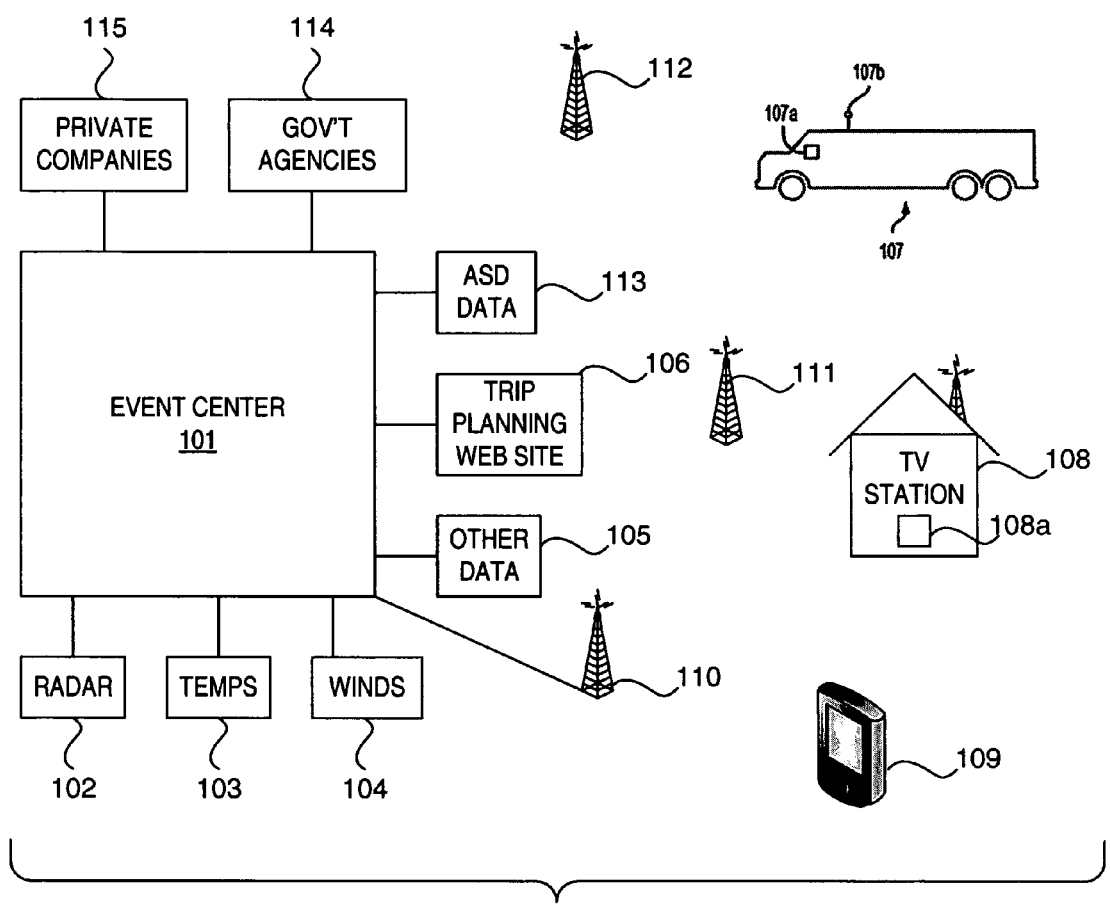
FIG. 1 shows a system including an event center that provides hazard information to a plurality of recipients 107, 108 and 109.

FIG. 1 shows a system employing various principles of the present invention. As shown in FIG. 1, an event center 101 receives event-related information from various sources, such as weather-related information from one or more radar sources 102, temperature data sources 103, wind data sources 104, and other data sources 105 (including, but not limited to, regional weather stations that provide air and pavement temperature, humidity, and other measurements). One or more antennas 110 coupled to weather center 101 may receive information regarding the location of mobile devices that use the system. In addition to or instead of radio frequency communication, this information can be received over the Internet, wireless network, or other computer network, or via dedicated dial-up telephone lines. Additionally, Aircraft Situation Display (ASD) data 113 can be received from various sources, such as the FAA, which distributes information regarding the current location and identity of aircraft.

Event center 101 may also be connected to and receive information from non-weather related entities, such as Federal, State, and/or local emergency response agencies 114 (fire, police, EMS, 911, FEMA, etc.), private response companies 115. In this manner, center 101 may be equipped to accept, provide, and/or relay information regarding any life threatening or hazardous event.

In one embodiment, event center 101 may be coupled to one or more trip planning web sites 106, which allow device operators to pre-register with the system and to optionally file trip plans, similar in nature to so-called "flight plans" that are filed by pilots. In this embodiment, described in more detail herein, device operators provide information regarding the identity of the device, the intended starting point and destination, and route information (e.g., which highways will be traversed), and this information is stored in event center 101 for tracking purposes.

Each recipient 107, 108 and 109 includes a corresponding device, illustrated by element 107a, 108a, and 109, that receives event information from event center 101 pertaining to that device's current and/or future predicted location. In certain embodiments, each device is equipped with a navigational device such as a GPS receiver that enables the device to determine its present position and a radio frequency transmitter that transmits the device's current location to weather center 101. Additionally, as described below, each device preferably includes a display and/or audio output device that permits event information to be communicated to the device operator. In one embodiment, the device comprises a cellular telephone, a wireless Personal Digital Assistant (PDA), or other similar device.

It is presumed that a network of radio antennae illustrated as elements 110, 111, and 112 is available to relay signals to and from each device. Alternatively, satellite communication can be used, or a combination of the two can be used. Various commercially available systems, such as the so-called "ON STAR™" system, or a mobile telecommunications carrier (e.g., Sprint PCS, Cingular, Nextel, etc.) can be used to transmit and receive information including device identification and location information. For aircraft, the FAA provides a data stream that identifies each aircraft by its tail number and provides the current location of the aircraft. Although not critical to the invention, it is contemplated that each device user (or fleet operator, where appropriate) will pre-register each device with event center 101 by automatically or manually providing device identification information that can then be used to correlate device locations with particular devices. Event center 101 may charge a fee for event reporting services on a monthly or transaction basis, thus providing a commercially beneficial arrangement.

In general, event center 101 generates event or hazard predictions for a plurality of geographic areas, such as four square kilometer "cells," and compares the location (current and predicted) of each cell in which there is a future event or hazard to device locations. The size of the cells is arbitrary, as they could be 100 yards on a side or even smaller as meteorological science improves and computing power continues to drop in price. For each event or hazard, event center 101 transmits a message to each device that is predicted to intersect with or be located in the cell, and optionally provides information concerning the nature of the event (e.g., severe snowstorm, flood, chemical plume, biological hazard, terrorist attack, etc.), the predicted time before the event will occur, based on the device's current path (including, for example, the direction and speed of the event), and the predicted duration of the event.

Event center 101 monitors weather conditions around various geographic areas such as counties, States, bodies of water, or the entire United States, and forecasts future events, including weather hazards such as severe storms, hail, snow, wind, ice, tornados, or other types of hazards. There are numerous methods of predicting weather involving both computers and humans, and various companies provide weather forecasting services, as does the National Weather Service. One example of a weather predicting method is disclosed in U.S. Pat. No. 5,959,567, entitled "Method and Apparatus for Tracking of Organized Storms."

Figure 2:
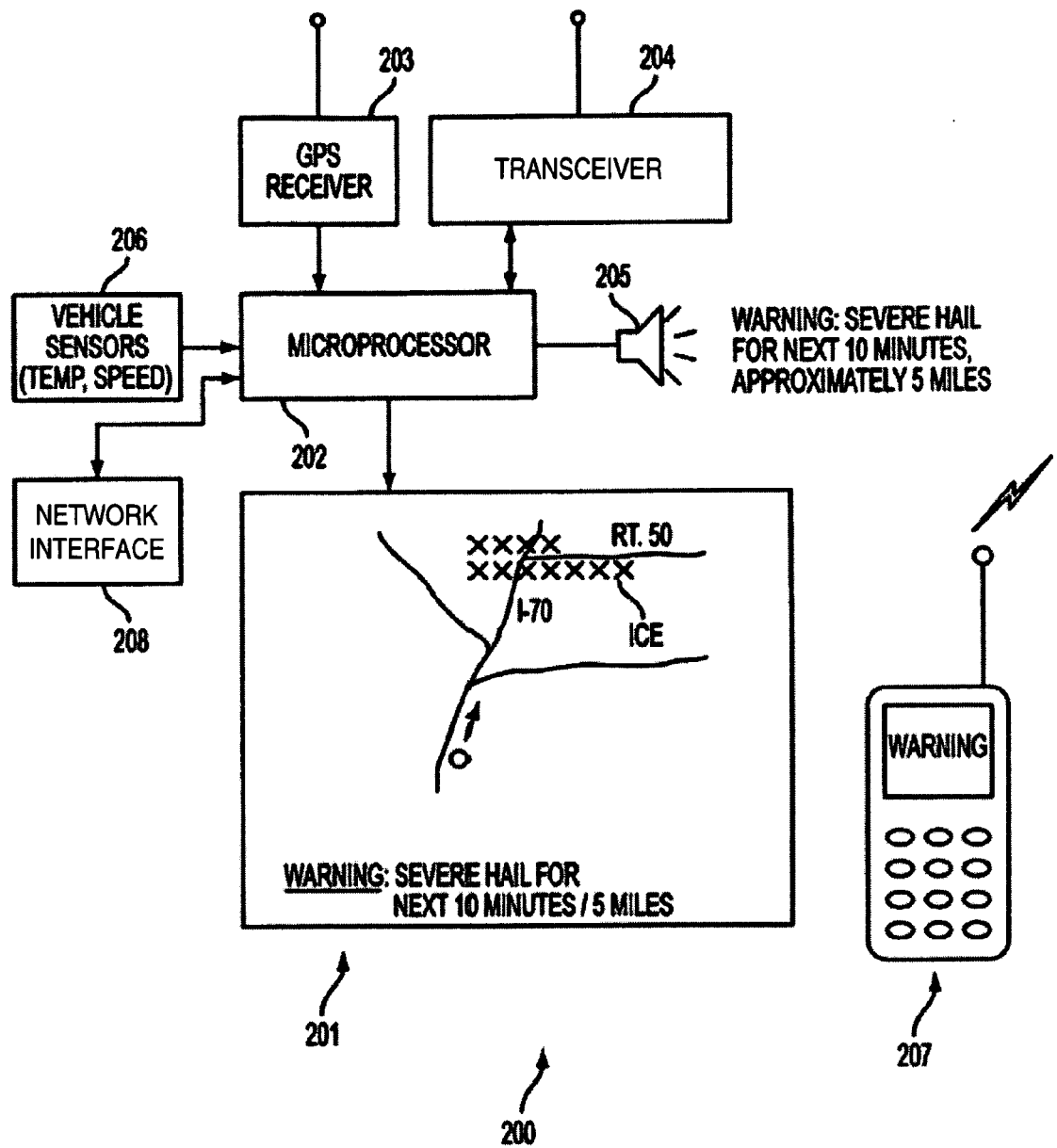
FIG. 2 shows one possible configuration for a vehicle warning system and method including a display 201 that shows weather hazard information and a cell phone 207 that optionally displays weather hazard information.

FIG. 2 shows an illustrative embodiment for a device 200 that can be used independently or installed in vehicles in accordance with the principles of the present invention. It will be appreciated that various types of navigational aids are commercially available, including GPS receivers and map displays that identify a device operator's current location. The inventive principles can be applied by modifying any of these commercially available units to incorporate additional functions contained herein. Moreover, various commercially available systems can be installed in a vehicle to transmit the current location of the vehicle for various purposes, such as theft prevention and vehicle recovery. Alternatively, device 200 may be a standalone data processing unit with the requisite capabilities, such as a laptop or notebook computer, personal digital assistant or mobile telephone, handheld or tablet PC, or the like.

As shown in FIG. 2, a GPS receiver 203 receives information from satellites that permits the device to determine its current location with a reasonable degree of accuracy. This information is fed into a microprocessor 202, which is programmed to periodically transmit the information through wireless transceiver 204, or through an optional other network interface 208. When installed in a vehicle, additional information from the vehicle, such as data from vehicle sensors (e.g., temperature, speed, etc.) can be transmitted to the event center through transceiver 204 or network interface 208.

Microprocessor 202 can be programmed with information regarding where to transmit the information (e.g., a radio frequency, Internet Protocol address, or the like). Instead of a single event center, multiple event centers can of course be provided, and each device can transmit to the nearest event center based on its location or to an event center for a particular type of event. Alternatively, distributed receiving centers can forward device location information to a central event center using a computer network such as the Internet. Transceiver 204 may include a receiver that receives messages transmitted from the event center and a transmitter for providing information from the device to the event center. Alternatively, the warnings can be received through Network interface 208. Warnings can be transmitted as text and/or audio messages to a cellular telephone number provided by the device operator corresponding to the device.

In one embodiment, a map display 201 of the type commonly used in commercially available vehicle navigation systems or on portable electronic devices is coupled to the microprocessor 202. As shown, the map shows the current location of the device superimposed on a map, such as a street or county map. Additionally, warning information received from the event center can be superimposed in the form of text and/or graphics on the map display in order to indicate the proximity and direction of the hazard or to the device operator. A speaker 205 can be used to generate audio warnings.

Turning to the operation of the event center, in one embodiment a computerized database of current and forecast event information, such as weather information, is generated and periodically updated. This data can be stored in a grid-type data structure in which a geographic area is divided into cells of a given size (e.g., four statute of nautical miles on each side). In other words, weather hazard information extracted from a weather map (extracted either by a human operator or automatically by computer) is converted into a discrete hazard indicator (e.g., severe snow, severe thunderstorm, hail, chemical cloud, etc.) and the indicator is stored into a cell corresponding to the area over which the hazard will occur. A county, for example, may be divided into a plurality of fixed-size cells, and a storm moving through the county may cause hazard indicators to be stored in a subset of those cells as the storm moves, thus avoiding sending a warning message to an entire county if possible.

For purposes of illustration, it will be assumed that a geographic region is divided into a plurality of cells. In each cell for which a current or forecast hazard exists, a hazard indicator is stored to indicate the current or predicted condition in the cell. The grid is updated as the event situation changes (e.g., the weather changes). Thus, every few minutes, the grid is updated to reflect the latest current and predicted future information.

Figures 3A, 3B, 3C:
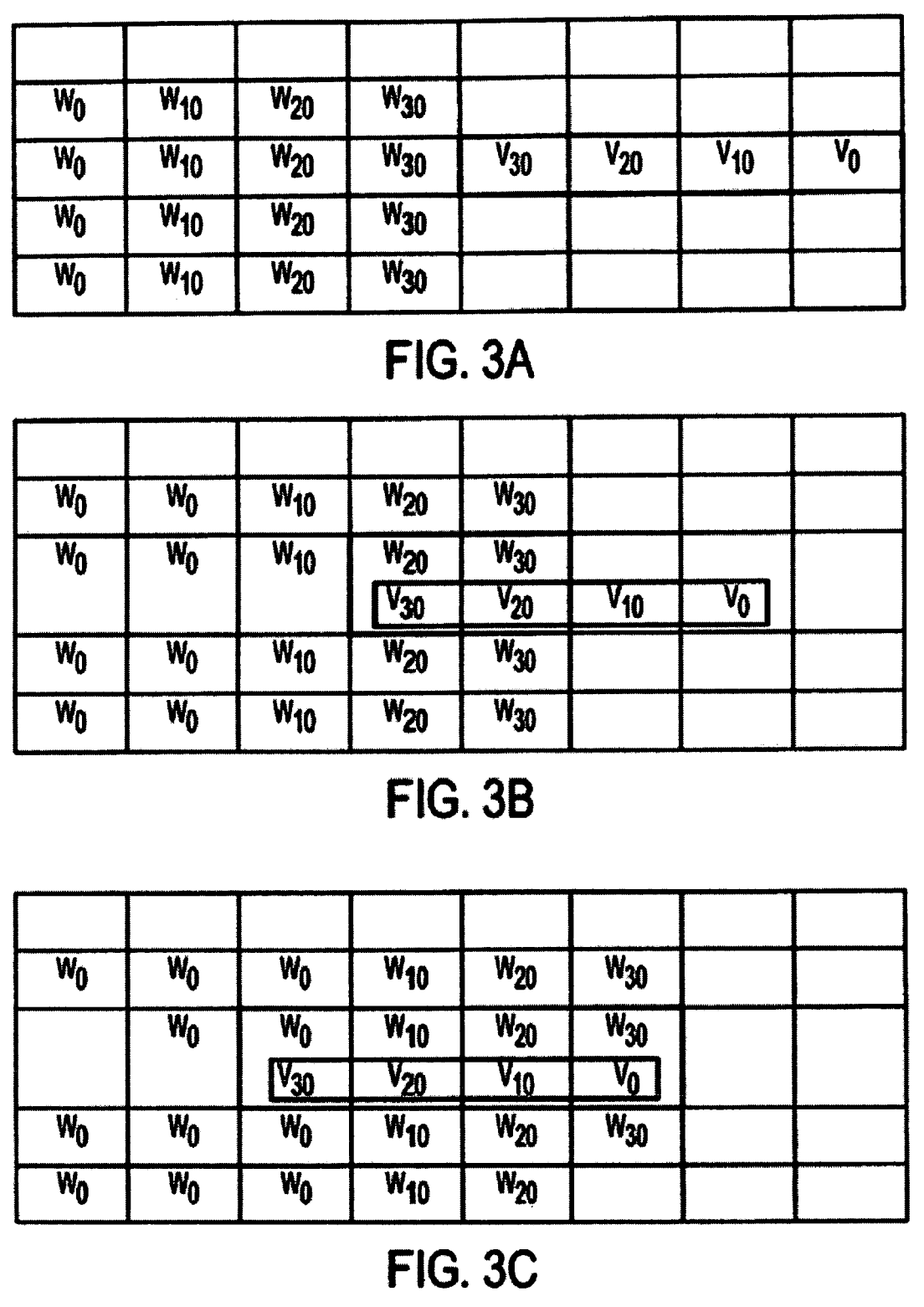

In one embodiment, information concerning each device location is also maintained in the weather grid, such that overlaps between forecast hazards and forecast device locations can be identified by computer. Assume that a severe thunderstorm is moving directly from west to east, and a device is moving directly toward the advancing storm (i.e., from east to west). FIG. 3A shows a current weather grid including a plurality of cells in which a current weather hazard W0 exists in four cells on the left side of the grid. A forecast weather hazard W10 (i.e., predicted to hit in 10 minutes) exists in the next set of cells just to the east of the current weather hazard. Similarly, a forecast weather hazard W20 exists just to the east of the 10-minute forecast, and a forecast weather hazard W30 exists just to the east of the 20-minute prediction. Thus, assuming that each cell measures 4 nautical miles on each side, FIG. 3A shows that the storm is generally moving east at a rate of 4 nautical miles every 10 minutes. Although only one weather hazard per cell is shown, it is of course possible to have multiple weather hazards activated in each cell (e.g., severe hail and severe lightning, for example). It will be appreciated that different cell sizes and granularity can be used as desired; in general, smaller cell sizes will result in increased computational needs, but greater specificity.

Also shown in FIG. 3A is a forecast vehicle or device location, illustrated by the notation V0 (vehicle position now) through V30 (forecast vehicle location 30 minutes from the present time). As shown in FIG. 3A, the vehicle is moving due west at approximately 4 nautical miles every 10 minutes. At the initial time as shown in FIG. 3A, the current vehicle position is not in a cell for which a weather hazard exists, and there is no projected overlap for the next 30 minutes based on the 30-minute forecast weather hazard (indicated by W30) and the 30-minute forecast vehicle position (indicated by V30). Thus, no warning is issued at this time. As meteorological science improves it will be possible to generate warnings for more than 30 minutes into the future.

FIG. 3B shows the weather grid of FIG. 3A after ten minutes has elapsed. In FIG. 3B, all of the current and forecast weather hazards have moved one cell to the right (i.e., moved due east by four nautical miles), and the vehicle positions (current and forecast) have moved to the left by one cell (i.e., moved due west by four nautical miles). Consequently, there is now an overlap between the vehicle's 20-minute forecast location and the storm's forecast 30-minute future location. According to one variation of the invention, the weather center generates a warning to the vehicle or device indicating that a weather hazard is forecast to hit the vehicle in 30 minutes and, optionally, when the vehicle will "clear" the hazard. In general, the system looks for matches to indicate the time that the hazard will first be encountered and its duration (i.e., based on the number of cells that the vehicle is expected to travel through). There may be times when the hazard is so large that the end of the hazard will be beyond the 30-minute interval; in such cases, no "duration" need be provided.

There are many different ways of evaluating the overlap situations illustrated in FIGS. 3A through 3F, and the following is intended to provide one example only. In one variation, for each overlapping cell, if the vehicle forecast time is greater than the weather forecast time (e.g., V30 is greater than W20), the cell is ignored for warning purposes, whereas if the weather forecast time is greater than or equal to the vehicle forecast time, a warning is generated. Thus, according to one variation of the method, a warning is generated for only one cell in FIG. 3B (i.e., the cell containing W30 and V20). The warning time is the weather forecast time for that cell (i.e., 30 minutes). The validity of this prediction can be seen by looking forward to FIG. 3E, which shows the situation 30 minutes later (i.e., the current vehicle position V0 coincides with a current weather hazard, W0).

Turning now to FIG. 3C (twenty minutes later), there are four cells in which the vehicle's location falls in cells containing weather hazards. However, the two leftmost cells contain overlaps where the vehicle forecast time is greater than the weather forecast time, and these can be ignored. The remaining two cells indicate that the vehicle's current location is in a 30-minute hazard cell (cell containing V0), and that the vehicle's 10-minute future location is in a 20-minute hazard cell (cell with V10). The hazard time can be calculated as T=V+(W−V)=W, or 20 minutes. That is, the hazard time is the weather forecast time in the leftmost cell that does not contain a vehicle forecast time that exceeds a weather forecast time. The validity of this forecast can be seen by looking forward to FIG. 3E (twenty minutes hence), which shows that the vehicle is in a cell experiencing a weather hazard.

Alternatively, where multiple overlapping cells occur, a subtraction value W−V can be obtained (i.e., subtract the vehicle forecast time from the weather forecast time) for each cell. The cell containing the lowest non-negative number is used to generate the warning value, and the warning value is the weather forecast time. For example, in FIG. 3B, there are two overlapping cells, the first one having a W−V value of −10, and the second having a W−V value of +10. The cell containing the +10 value is used, and its weather forecast time is 30 minutes. Therefore, a 30-minute hazard warning is generated. Similarly, in FIG. 3C, there are four overlapping cells, as follows: first cell W−V=−30; second cell W−V=−10; third cell W−V=+10; fourth cell W−V=+30. The cell generating the lowest non-negative number has a weather forecast value of 20 minutes, which can be verified by looking ahead 20 minutes (FIG. 3E). Similarly, in FIG. 3D, there are three overlapping cells, as follows: first cell W−V=−20; second cell W−V=−10; third cell W−V=+10. The weather forecast value of that cell is 10 minutes, which can be verified by looking ahead 10 minutes (to FIG. 3E). Finally, in FIG. 3E there is only one overlapping cell, which has a W−V value of zero. The weather forecast value for that cell is zero, indicating that a weather hazard presently exists for the vehicle.

FIGS. 4A to 4C show a second illustrative example in which the vehicle's predicted path changes over time (i.e., from generally northwest to generally southwest). Beginning in FIG. 4A, at an initial time there is an overlap between two cells. The first cell has a W−V value of −20, and the second cell has a W−V value of zero. The weather forecast for the non-zero cell is 20 minutes, indicating that a weather hazard will occur in 20 minutes.

In FIG. 4B, ten minutes later, there are four overlapping cells, with W−V values as follows: first cell, W−V=−30; second cell, W−V=−10; third cell, W−V=+10; fourth cell, W−V=0. The two non-negative cells show weather hazard forecast times of 20 minutes and 10 minutes, respectively. The lowest non-negative cell has a forecast time of 10 minutes, which can be given as the warning.

In FIG. 4C (twenty minutes after FIG. 4A), the forecast vehicle position has now shifted to a southwest position, possibly as a result of receiving updated position information from the vehicle, or due to an interpolated new path based on updated information, or due to other information such as deviation from a previously provided travel plan. In FIG. 4C, there are two overlapping cells, with W−V values as follows: first cell, W−V=0; second cell, W−V=+10. Using the cell having the lowest value (0), the forecast weather hazard time is 10 minutes, which can be given as the warning.

In addition to providing a warning indicating the time that a weather hazard will be encountered, the system can provide an estimate as to the duration of the hazard, based on the current travel path of the vehicle. For example, if the weather grid indicates that the forecast vehicle position for the next 30 minutes will intersect cells in which storm activity is predicted for the next 30 minutes, but thereafter will be cleared of the storm cells, the system can inform the vehicle operator that the weather hazard will last for 30 minutes. In FIG. 3C, for example, a hazard duration value of 20 minutes can be given, because the vehicle's 20-minute future position is not in a cell that contains a weather hazard.

Those of skill in the art will appreciate that similar methodologies may be used to provide warning messages regarding events other than meteorological events, including smog warnings, chemical or biological attack warnings, earthquake, volcanic eruption, and the like.

As explained above, event center 101 preferably maintains information regarding the positional location (e.g., latitude and longitude) of each of a plurality of devices that have pre-registered with the event center to provide mobile hazard reporting services. In one variation of the invention, each device periodically transmits its current location to the event center, and this information is used to update the grid. Devices can pre-register with the event center by providing identification information, personal identifier, serial number, or other unique ID, (e.g., the VIN for an automobile, a license plate number, fleet serial number, or the like), and this information is transmitted along with the positional information to event center 101. Additionally, the computer in event center 101 can extrapolate future (forecast) positions for the device by comparing two previous locations along with the time differences between transmissions from those locations.

For example, if a device has moved between two latitude/longitude points within a certain period of time, the computer can calculate a predicted heading and velocity based on these two points and the elapsed time between the points. This heading and velocity can be translated into cells using simple linear algebra.

Device locations can also be correlated and interpolated based on a "flight plan" provided by a device owner before leaving for a trip. A web site can be used to facilitate the entry and transmission of this information to weather center 101. For example, a driver can indicate on a map the starting point, ending point, and intended travel path (e.g., by specifying or highlighting this route on a map). Weather center 101 can use this information to determine the likely position of a device based on the starting time of the trip and the elapsed time. Additionally, information regarding speed limits on various highways can be taken into consideration when determining the likely position of a device (e.g., if traveling on an interstate that has a 65-mph speed limit, the computer can assume that the vehicle has maintained this speed between two points). Consequently, if event center 101 does not or cannot receive a signal indicating device position, it can estimate the position based on the trip plan filed by the device operator. In the event that hazards are predicted for the vehicle, the system can suggest an alternate route that avoids or minimizes intersections with cells that have hazards.

In another variation of the invention, devices can register to use the service by using a telephone (e.g., a cell phone) to dial a telephone number and provide the phone number of the device, to be activated for alerts. For example, a family traveling by automobile can use a cell phone capability of the device to call a toll-free telephone number and enter the telephone number of the device. Thereafter, they can periodically transmit their current location. Event center 101 can thereafter transmit weather hazard warnings directly to the cell phone, in the form of short text messages, or by voice messages.

Aircraft positions can be obtained from an Aircraft Situation Display (ASD) data source, such as that provided by the Federal Aviation Administration. In this variation of the invention, event center 101 obtains periodic location information and identification information (e.g., tail numbers) and uses it to identify the location of airplanes. Consequently, it is not necessary for aircraft to transmit their location to weather center 101, although such a configuration is of course within the scope of the invention.

In addition to transmitting current location information, each device may transmit other data, such as temperature and current and average velocity. Temperature data from the device could be used, for example, to help predict whether the roads will be icy based on meteorological conditions.

Figure 5:
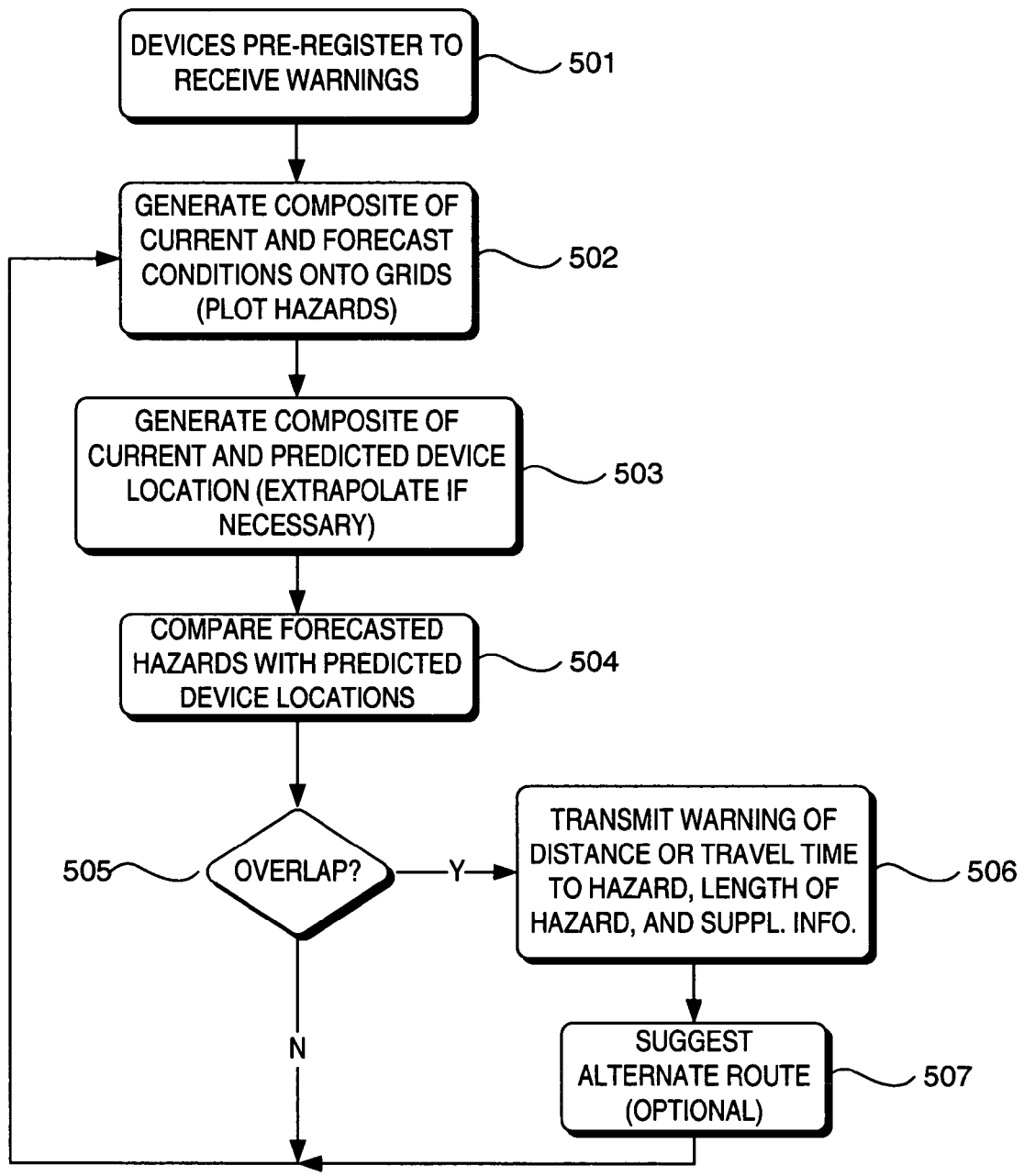
FIG. 5 shows a method of generating weather hazard information for vehicles according to various principles of the present invention.

FIG. 5 shows various steps of a method that can be used to carry out various principles of the present invention. Beginning in step 501, one or more devices pre-register to receive warnings. As described above, this pre-registration can occur using a web site; a telephone; data connection, or by other means. The registration step associates a device identifier with the device, so that subsequent location updates for that device identifier can be correlated with the device, including means for communicating with the device (e.g., an Internet Protocol address of a device; a cell phone telephone number to which warnings will be transmitted, the network address of a wireless PDA; or the like). Once registered and activated, event center 101 will track and provide warnings to the device.

In step 502, a composite of current and forecast conditions is generated and mapped onto a grid such as the type shown in FIG. 3A. There are many different methods of predicting hazards, including human-originated means, computer-generated means, and combinations of the two. As is conventional, various meteorological displays can be generated to show various forms of precipitation, temperatures, pressures, and wind conditions. The data can include radar reflectivity data such as that generated by NEXRAD radars operated by the National Weather Service; "slime track" information showing the position of observed or actual tornados over a period of time; meteorologist-entered information such as the suspected location of a tornado or other severe weather event; information derived from spotters; and other data tending to show a severe weather event such as a tornado. In one embodiment, this information can also include predicted future storm or tornado tracks that are predicted using any of various technologies, such as those illustrated in U.S. Pat. No. 5,959,567, entitled "Method and Apparatus for Tracking of Organized Storms."

In another embodiment, a future path can be predicted using human judgment (e.g., trained meteorologists monitoring various radar data and other sensed information). In yet another embodiment, a projected path as provided by the National Weather Service (NWS) can be used. The NWS often provides an array of points or "dots" that can be connected to determine the path along which a tornado or hurricane is expected to move.

A tornado location can be heuristically determined using a combination of radar echo shape ("hook" echo), radar wind velocity and echo structure, all well known in the meteorological community. Once the initial position is determined, a predicted future location can be predicted using the principles set forth in the '567 patent, or a meteorologist can use his or her judgment to establish a projected future path. The National Weather Service transmits a Tornado Detection Algorithm (TDA) in its WSR-88 radar data stream, and this TDA position could thus also be used. The NWS also uses its own movement algorithms, which could be employed in conjunction with the principles of the invention. Finally, information supplied by "spotters" can be used in conjunction with any of the above techniques in order to pinpoint the location of an actual tornado.

Event center 101 may similarly receive data regarding non-meteorological events from government agencies and/or private companies.

In step 503, a composite of current and forecast device locations is generated and stored in a data structure like that of FIG. 3A, such that device positions and hazards can be evaluated to determine whether there are intersections in cells that would warrant one or more warnings. As explained above, device locations can be extrapolated if necessary, and updated as device location updates are received.

In step 504, the forecast hazards and the forecast device locations are compared to determine whether there are any overlaps. As explained above, for example, if a forecast device position in 30 minutes will intersect with a cell in which a storm hazard is forecast for 30 minutes, a warning will be sent to the device operator, based on the pre-registered information (e.g., information correlating the device identifier to a cell phone number, IP address, or other communication tool). Additionally, the duration of the weather hazard can be provided based on the forecast path of the device and the end of the weather hazard. For example, if a severe hailstorm is predicted to occur across a large number of cells, but the vehicle will have passed beyond the cells in 45 minutes, then the event center can indicate that the hazard will subside in 45 minutes.

Consequently, in step 505 a warning of the distance or travel time to a hazard is transmitted to the device or devices in the cell corresponding to the hazard, along with the duration of the hazard and other supplemental information as available (e.g., tornado spotted in the cell in which the vehicle is traveling). In step 506, an optional step of suggesting an alternate route can be provided.

In an alternative embodiment of the invention, the functions of the event center may be performed by system 200 (FIG. 2) based on received location and hazard information, such as meteorological or weather information. That is, each system 200 may include control logic (e.g., computer software executed by microporocessor 202) to perform the functions of an event center with respect to itself, calculating warning information for itself based on the received location and hazard information. In such an embodiment, an information distributor may relay pertinent weather and hazard information to each system, or the information may be received directly from primary information sources (e.g., the National Weather Service).

Rotating User Map

According to an aspect of the invention, a rotating user map may be used to improve vehicle and device navigation, and hazard awareness, resulting in improved safety and productivity. While the invention is described with respect to weather hazards and meteorological information, the invention is applicable for providing warnings for any type of hazard, including natural or man-made disasters, life threatening events, etc.

The GPS receiver 203 may communicate with the microprocessor 202 to generate for display on display 201 a map that is tied to latitude and longitude coordinates and that "rotates" as the user changes directions. That is, the top of the display (or any arbitrary fixed point) faces the same direction the user is traveling. In addition, the range of the display (i.e., the level of granularity and size of the area visible on the display) is selectable by a user of the device or dynamically by software controlling the device's operation. The range refers to the zoom level of the display. For example, a customer may use a short range (high zoom level) when using the system primarily as a navigational tool, e.g., where the display depicts an area of only 1 square mile, in order to view in detail the immediately surrounding area. However, a customer may use a larger range (low zoom level) when using the system to receive meteorological information and/or warnings, e.g., the display depicts an area of 100 square miles, in order to clearly view meteorological information for a larger geographic area. The zooming of the display may be controlled by the microprocessor 202.

Figure 6:
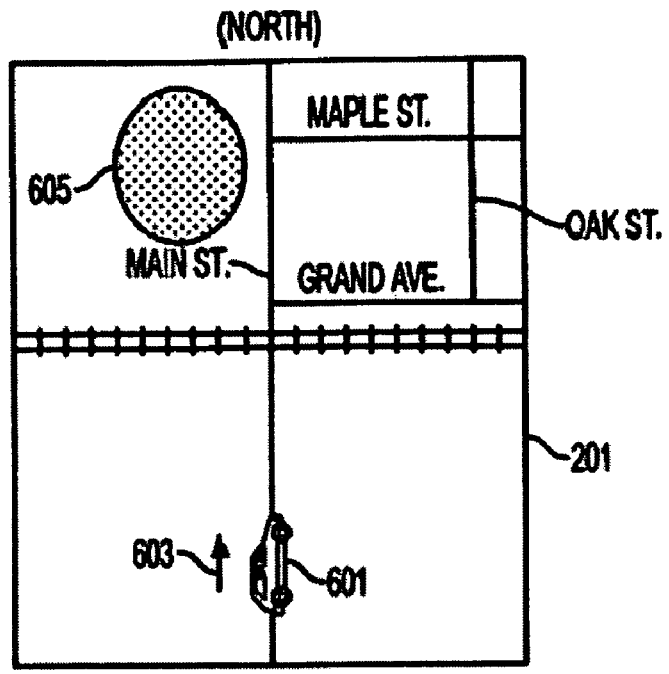
FIG. 6 shows an illustrative rotating user map in a first orientation according to an aspect of the invention.
Figure 7:
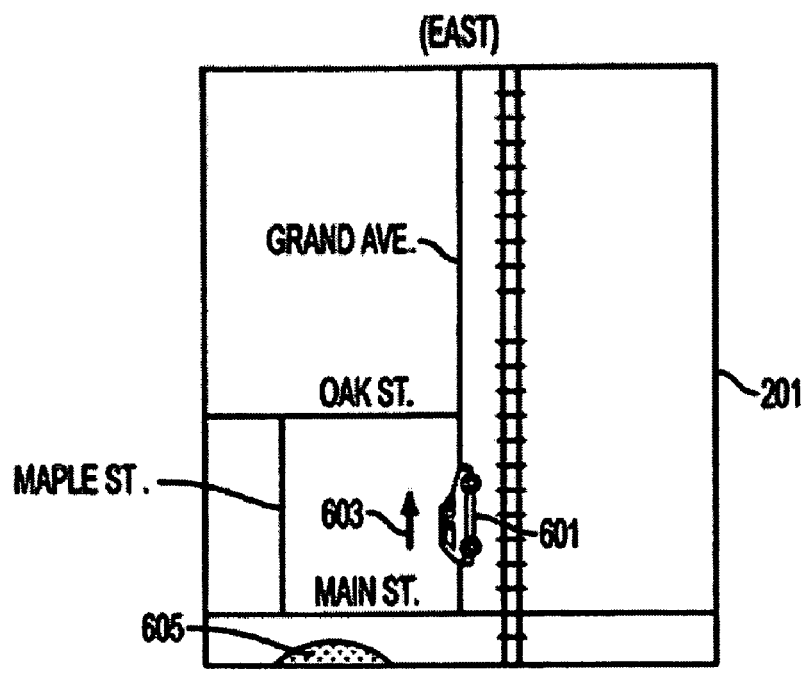
FIG. 7 shows an illustrative rotating user map in a second orientation according to an aspect of the invention.

FIG. 6 illustrates a display 201 of device 200, where the system is traveling to the north, and rain 605 is illustrated with respect to the location of the system. If the user holding the system or vehicle in which the system is located turns right onto Grand Ave. and begins traveling to the east, the display rotates so that the direction of travel is at the top of the display (or any other predetermined side), such as is illustrated in FIG. 7. While an icon 601 depicting a car is used to indicate the system's current position, any icon may alternatively be used. Arrow 603 is for illustrative purposes, indicating the direction of travel of the system, and does not necessarily need to be included on display 201.

Figure 8:
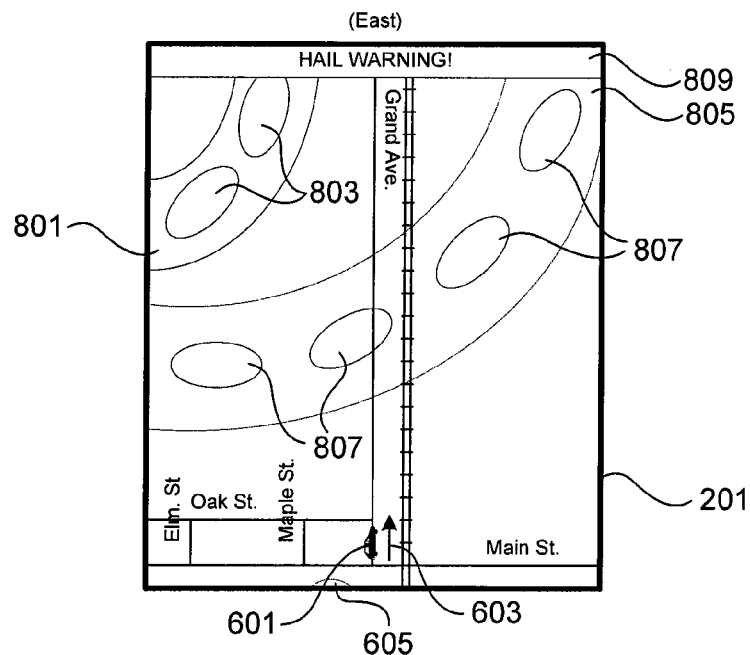
FIG. 8 shows an illustrative rotating user map in the second orientation according to an aspect of the invention, zoomed out from FIG. 7.

With further reference to FIG. 8, an aspect of the invention provides current and forecast weather information pertinent to the system's route of travel. An override system may cause the zoom level of the display to change to insure that the user receives critical information regardless of the range or direction of travel when the information becomes pertinent. The method as performed by the system may be controlled by the microprocessor connected to the GPS receiver with appropriate circuitry, hardware and/or software control logic.

When a user is viewing the display at a high zoom level (e.g., one mile) to view detailed street, topographic or marine information, meteorological information regarding an approaching storm might not be visible on the display 201 until the system (and its user) is too near the meteorological phenomenon (e.g., inclement weather such as heavy rain or a lightning storm) to take appropriate precautions such as altering his or her route of travel to avoid the inclement weather. Thus, according to an aspect of the invention, the system automatically enlarges the range (lowers the zoom level) as appropriate such that the meteorological threat is visible on the display as well as the icon 601 indicating the position of the system.

FIG. 8 illustrates the display after the system automatically zooms out from the display illustrated in FIG. 7. FIG. 8 illustrates the icon 601 indicating the current location of the user, the present location 801 of a storm with severe weather areas 803 (e.g., hail), and the forecast location 805 of the storm and severe weather areas 807, with which the system will intersect. FIG. 8 also illustrates a warning 809 indicating that hail is predicted. The warning may optionally include a duration or expiration time (see FIG. 9, discussed below). The types of hazards or inclement weather for which the system will automatically adjust the range of the display 201 may be user-defined or set by the system software.

In some embodiments the system automatically changes the zoom level without user input if the inclement weather will intersect an extrapolated path of the user or the path as depicted on a pre-registered trip plan. The extrapolated path of the user may be based on a direction of travel of the system, or may be based on the road on which the user is currently traveling. That is, if the road turns or changes directions, the system may assume that the system will turn and change directions with it. Alternatively, the user may specify or the system may provide a default safe distance, e.g., five miles, where if the inclement weather is or is forecast to be closer than the safe distance value, then the system will automatically adjust the zoom such that the inclement weather (or weather forecast) is visible on the display.

However, if the system and the inclement weather are not calculated to intersect (or get closer than the safe distance) at some future time, the system might not automatically change zoom levels. For example, when the system is traveling away from the inclement weather and the paths of the system and the weather do not intersect, the system will not change the zoom level and interrupt the user's viewing of the display (e.g., the user is heading south at 65 mph and the inclement weather behind the user, while also heading south, is only moving at 30 mph).

Figure 9:
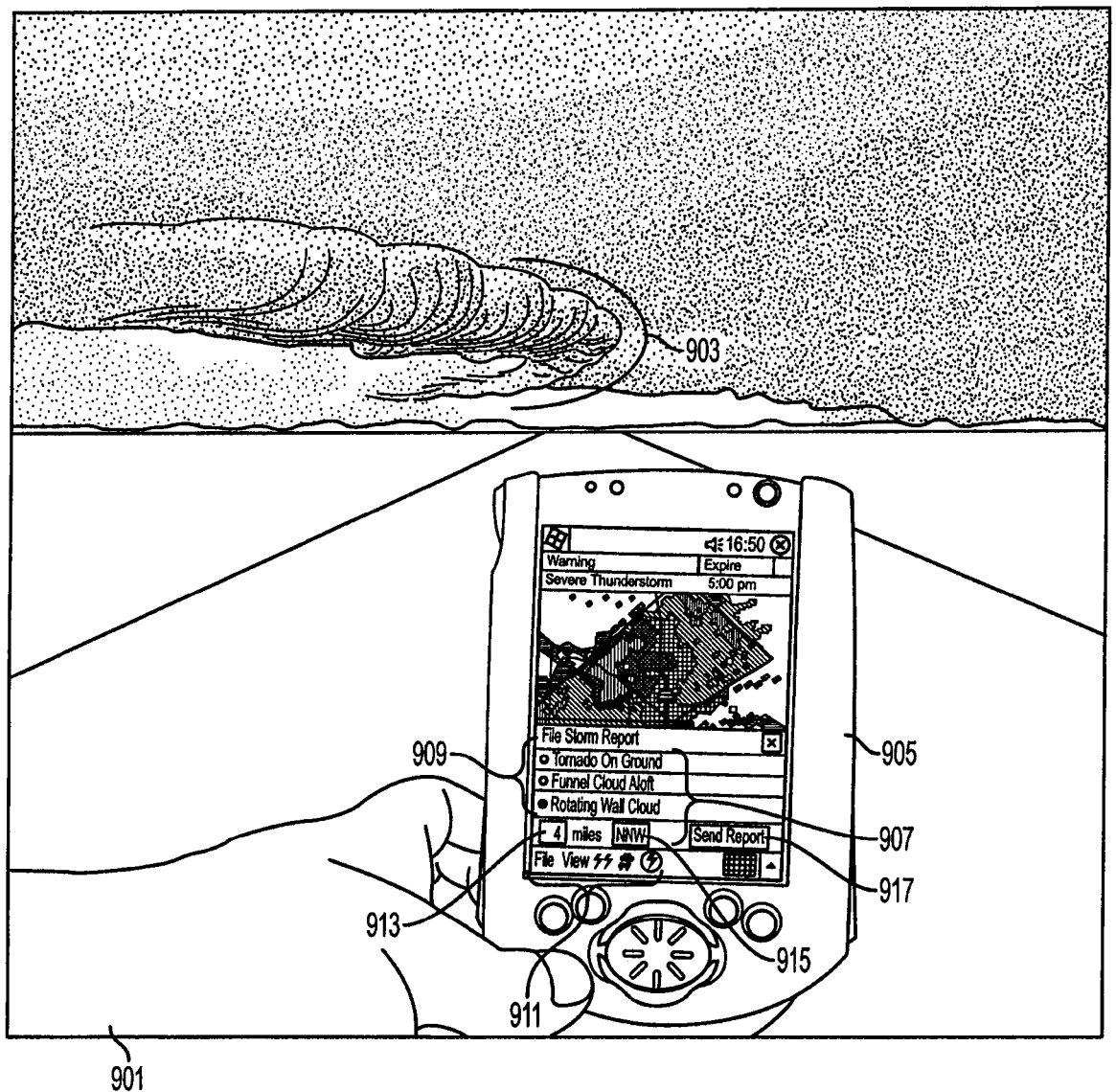
FIG. 9 illustrates a storm spotter observing meteorological conditions using a mobile device, according to an illustrative embodiment of the invention.

Using the above described systems and methods, the weather warning system is user centric in that the display is based on the system's specific location. Another system one mile away will provide a different display. Each system displays hazards or hazard warnings when the hazard is pertinent to the specific system's location or path. Each system overrides the user to display a hazard pertinent to the system's location if the hazard is within a distance selected by the user, and each system will not interrupt a user when the system is not threatened by the hazard. By only displaying information pertinent to the specific system, the effectiveness of a storm warning or other alert is maximized because false alarms are minimized. Another mobile device 905 displaying hazard information on a rotating user map is illustrated in FIG. 9, discussed further below.

Reporting Spotter Information

As indicated above, meteorological condition information or hazard information may be observed by a spotter or user near a location of the observed condition or event. FIG. 9 illustrates a spotter 901 observing, e.g., meteorological condition 903, namely, a rotating wall cloud, indicative of a possible tornado. Spotter 901 may enter data 907 into a mobile computing device 905, e.g., a personal digital assistant, smartphone, mobile telephone, or the like. Data 907 may include a type 909 of the observed condition, and an approximate location 911 of the observed condition.

Various input methods may be used to enter data 907 into mobile device 905. For example, the observed condition may be selected from a constrained list of predetermined inputs, e.g., by using a drop down list, radio buttons, or the like. Alternatively, the spotter 901 may manually enter the observed condition, e.g., by typing or writing input into the mobile device 905 as is known in the art. The predetermined inputs may be selected by the mobile device based on a category (e.g., meteorological, medical, natural disaster, terrorist, etc.) and subcategory (e.g., under meteorological, subcategories may include tornado, precipitation, lightning, etc.) selected by the spotter. Thus, if the spotter selects the meteorological category and tornado subcategory, the mobile device may provide a drop down list or radio buttons having selections for "Tornado On Ground," "Funnel Cloud Aloft," and "Rotating Wall Cloud" as is illustrated in FIG. 9. The following table provides illustrative categories, subcategories, and selections within subcategories that may be used.

TABLE 1

| Category | Subcategory | Selections |
|---|---|---|
| Meteorological | Tornado | Tornado On Ground |
|  |  | Funnel Cloud Aloft |
|  |  | Rotating Wall Cloud |
|  | Precipitation | Rain |
|  |  | Sleet |
|  |  | Hail |

TABLE 1-continued

| Category | Subcategory | Selections |
|---|---|---|
|  | Surface Conditions | Snow |
|  |  | Flooding |
|  |  | Icy Roads |
|  |  | High Winds |
|  |  | Sub −32° F. |
|  |  | Heat Advisory |
| Medical | Individual | Heart Attack |
|  |  | Heat Exhaustion |
|  |  | Seizure |
|  |  | Broken Bone |
|  | Vehicular Accident | Auto Accident |
|  |  | Motorcycle Accident |
|  |  | Bicycle Accident |
| Natural Disaster |  | Volcanic Eruption |
|  |  | Earthquake |
|  |  | Forest Fire |
| Terrorist Attack | Physical | Bomb |
|  |  | Gunfire/Artillery |
|  |  | Hostages |
|  | Chemical | Liquid |
|  |  | Gaseous |
|  | Biological | Contained |
|  |  | Uncontained |

Those of skill in the art will appreciate that alternative categories, subcategories, and selections within subcategories may be used to suit the needs of the particular system. That is, the specific categories, subcategories, and selections within subcategories used is secondary to the fact that categories, subcategories, and selections within subcategories are used to provide a constrained list of selection items to a user. In addition, more or fewer hierarchical levels of categories may alternatively be used and, as evidenced above, the same number of category levels need not be used for each top-level category.

The approximate location input by the user may be based on the location of the mobile device 905, e.g., when device 905 includes a global positioning system (GPS). The spotter 901 may enter information indicating that the observed condition is at the location of the mobile device 905, or may provide information indicating the observed condition's location relative to the mobile device 905, e.g., by providing a distance 913 from the mobile device 905, and a direction 915 from the mobile device to the observed condition. Optionally, the mobile device 905 may be equipped with a compass and/or a distance meter (e.g., a laser distance calculator) to help the user determine the direction of an event from the mobile device as well as the distance of the event from the mobile device. The device may then convert the location information into estimated latitude and longitude coordinates. In addition, the user of the mobile device may provide an approximate location of the observed condition by selecting a position on the displayed map. That is, the user can touch the screen at the approximate location of the observed condition, and the device translates the touch input coordinates to an approximate location (e.g., latitude and longitude) of the observed condition based on the input location on the displayed map.

In other embodiments, alternative methods of computing location may be used. For example, the system may be adapted for use in a particular location, such as a large stadium, arena, race track, or other venue in which prompt reporting of hazardous and life-threatening events can potentially save lives. In such a scenario, the system may be adapted for the user to input a section, row, and/or seat number where an affected individual is located. That is, if a patron seated in section 212, row AA, seat 10 is having chest pains, that patron (or others around him or her) can signal an usher or employee equipped with a mobile device 905 adapted for use in the particular venue. The employee may then select Medical/Heart Attack from the constrained list of selection items on the device, and enter the location section 212, row AA, and optionally seat 10 (the section and row numbers typically provide enough specificity for emergency response purposes). The employee then sends the information by selecting the 'send' button 917 or similar option. The information is wirelessly transmitted to the event center 101, and a confirmation message may optionally be relayed back to the device 905 from which the employee sent the information to confirm that the report was received by the event center 101. In this example, the venue operator may maintain its own event center, in which case the venue operators are immediately notified of the patron's medical situation and can initiate the emergency response thereto. In addition, the venue operator may have a GIS map that correlates GPS locations to specific seat locations, where the reported location information is sent in latitude/longitude format.

In another embodiment of the invention, the mobile device 905 may be equipped with a RFID tag reader, and RFID tags may be located throughout a venue, e.g., at each section, row, seat, conference hall, points of interest, offices, etc. Each RFID tag then identifies the location in which the RFID tag is placed when activated by the RFID tag reader on the mobile device 905, and the location information is automatically input into device 905 for further communication to event center 101.

Upon submitting the data to the event center 101 (FIG. 1), the event center may perform an integrity check on the reported data. The integrity check may include determining the user or spotter from which the information was received. If the spotter is known to the organization operating the event center, the information is more likely to be reliable than if the information is received from a user unknown to the organization operating the weather center. In addition, the event center may compare the received information to known conditions (e.g., current weather) to determine if the condition is likely or even possible. For example, upon receiving a report from a spotter that a rotating wall cloud has been observed at location X,Y, the event center may compare the report with other meteorological information. If all other meteorological information indicates that location X,Y is sunny with no clouds in the sky, the received report might be discarded or ignored.

Figure 10:
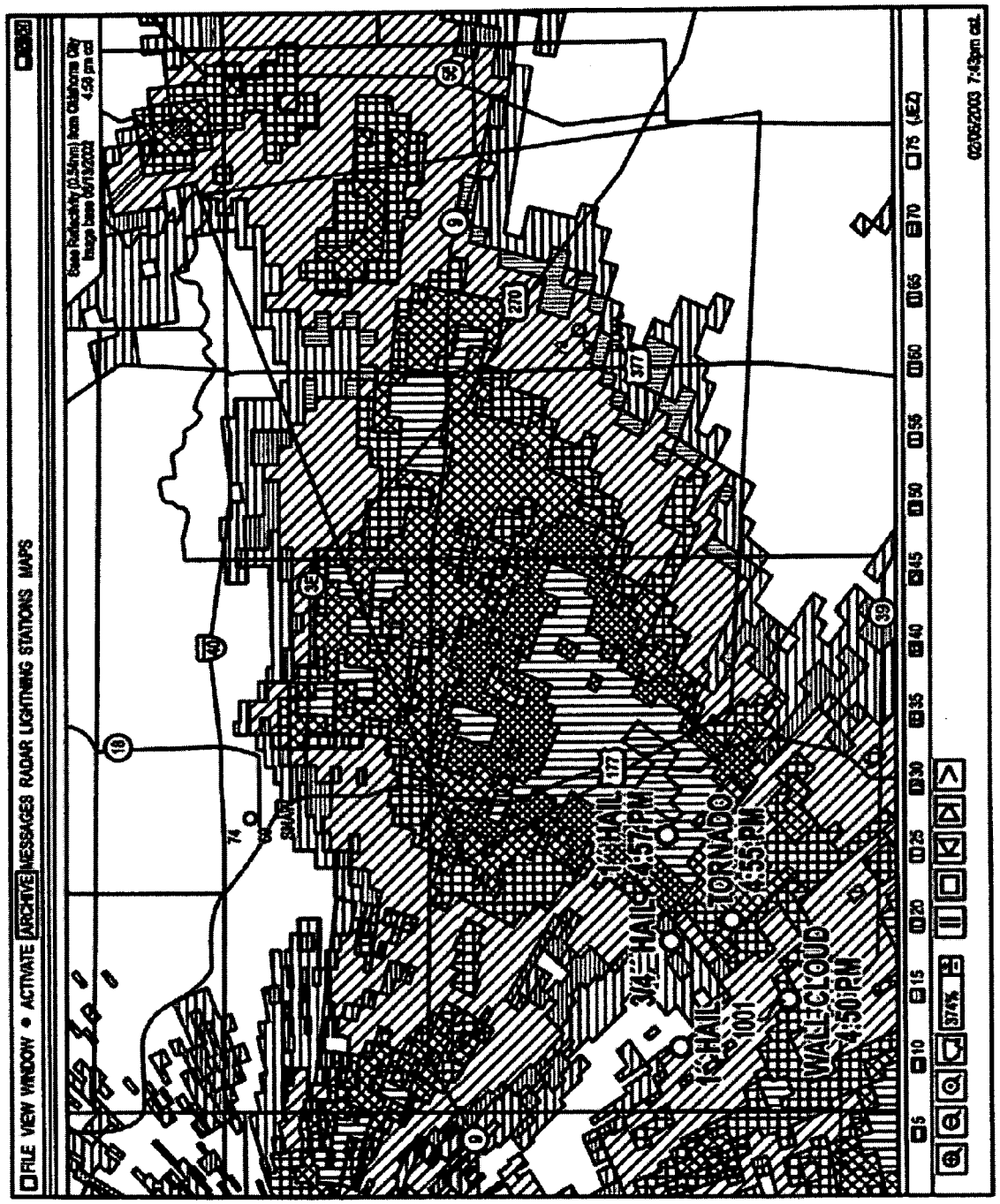
FIG. 10 illustrates a display of meteorological conditions as reported to a weather monitoring system, according to an illustrative embodiment of the invention.

After performing the integrity check, the event center integrates the newly received information with presently known information, e.g., information received from other sources such as the National Weather Service, FEMA, etc. In addition, the event center may transmit the updated information to remote subscribers who have previously requested to be kept informed of conditions in certain areas. FIG. 10 illustrates a subscriber display including an indication 1001 of the spotter's report regarding the rotating wall cloud.

The reporting system described herein is especially useful in high-noise environments, such as at auto races, during high winds or storms, amidst a panicked crowd of people, or at other high-noise events, because communications are not dependent on voice communications or being able to hear a user attempt to audibly report event information. The system is also particularly useful in self-sustained environments or areas that do not rely on public emergency response groups. For example, many auto race tracks, speedways, and super-speedways are not supported by public 911, fire department, paramedic service, and/or hospitals. That is, they provide their own fire department, their own paramedic service, and/or their own hospital. In such a scenario, the present system can be used to report events when calling 911 would only introduce an additional level of delay (i.e., 911 would either inform the caller that they cannot send paramedics to the caller's location, or 911 would merely call the venue operator for further action on the venue operator's part).

Figure 14:
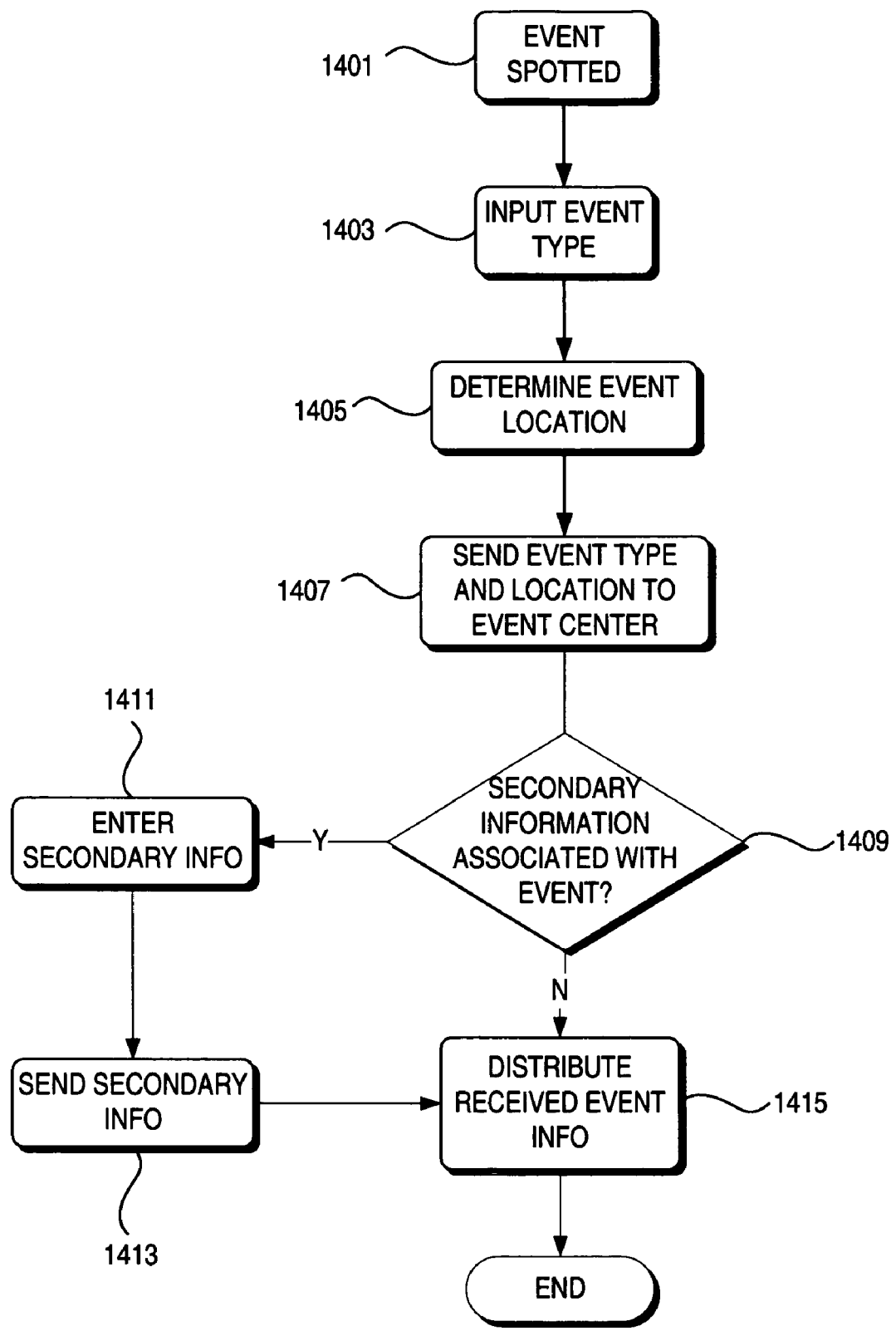
FIG. 14 illustrates a method for reporting follow up information based on the type of event initially selected by a user.

With further reference to FIG. 14, one or more aspects of the invention may provide or allow a user of a mobile device adapted to perform as described herein, e.g., any of devices 107*a*, 108*a*, 109 (FIG. 1), device 200 (FIG. 2), or device 905 (FIG. 9), to report follow up information relevant to the reported event based on the type of event or hazard initially reported by the user. That is, certain event types may have associated secondary information that, while not necessary in the initial report, provides useful follow up information that may assist private, local, state, or federal agencies in responding to the event report. For example, if a tornado is reported, it would be useful to provide a direction and speed of travel of the tornado. If a heart attack is reported, it would be useful to provide blood pressure information, if known. The below table provides an illustrative example of secondary information that may be associated with event types, and stored in the memory of the mobile device, as well as the expected format of the input values for the secondary information. The secondary information preferably comprises one or more numerical quantities, although the invention is not limited in this respect as is evident in Table 2. For example, the secondary information may also comprise a Boolean variable, text, or an image such as a photograph.

TABLE 2

| Event Type | Secondary Information Requested | Format |
|---|---|---|
| Tornado on ground | Speed | mph |
|  | Direction of travel | compass direction |
| Heart Attack | Blood pressure | Number |
|  | Electrocardiogram (EKG) | Binary data |
| Broken Bone | Bone location | Text |
| Flooding | Depth | Number (Ft.) |
| Hostages | Number of people | Number |
| Motorcycle Accident | Rider wearing helmet? (Y/N) | Boolean |
|  | Photograph of helmet | Image |

The above are merely examples of secondary information that may be provided. Those of skill in the art will appreciate that different or additional secondary information may be provided, as determined by the needs of the particular system and event types used. The specific secondary information provided is secondary to the ability to provide secondary information based on a selected event type.

Referring to FIG. 14, in step 1401, a user of a mobile device visually observes or learns of an event or hazard regarding which the user desired to report back to the event center. Such an event may include any event discussed herein, including meteorological events, medical events, etc. After visually observing or learning about the event, the user inputs an event type in step 1403.

The device determines the event location in step 1405, e.g., based on a GPS location (e.g., latitude, longitude, and altitude) determined automatically by the mobile device, based on the GPS location in conjunction with a user provided or automatically determined direction and distance from the mobile device of the event, other user provided information (e.g., section, row, and/or seat number of a venue), or based on externally obtained location information, e.g., by reading an RFID tag storing location information. These are but a few examples of how the location may be determined. The specific methodology used is secondary to the ability of the user or device to input or determine the event location in proximity to the mobile device. The mobile device in step 1407 sends the event type and event location to the event center via a wireless communications network, e.g., a wireless data link over the Internet or a cell phone with a modem.

In step 1409 the mobile device determines whether any secondary information is associated with the selected event type. The mobile device may determine whether any secondary information is associated with the selected event type by looking up the selected event type in a table, similar to Table 2, above. Alternatively or in addition to the lookup table of secondary information based on event type, the event center, upon receiving the initial report of the event type and event location, may transmit a list of requested secondary information back to the reporting mobile device, optionally with a confirmation of receipt of the initial report. If no secondary information is associated with the selected event type, the method proceeds to step 1415.

If secondary information is associated with the selected event type, the mobile device prompts the user, and the secondary information is entered in step 1411. The mobile device may also receive automated secondary information input from intelligent devices connected to or in communication with the mobile device, e.g., a camera and/or microphone. The mobile device transmits in step 1413 the entered secondary information to the event center.

The event center distributes the received information, e.g., the initial event type, event location, and associated secondary information, to third parties in step 1415. Event center may simply display the reported information on a display device for an event center operator to visually observe, and may optionally output audio to alert the operator of the incoming report. The server computer at the event center may log the event and store records of it for future use, and may also forward alerts to other personnel, as appropriate. In addition, authorized users may access the data stored on the event center server, e.g., via the Internet.

FIGS. 15-18 are screenshots showing one or more illustrative embodiments of a graphical user interface for displaying reported event or hazard information. As stated above, this user interface may be monitored by an event center operator, who may receive notifications upon arrival of new event information into the event center server. A notification is an action taken in response to the arrival of event information at the event center. Notifications may alert users of the new event information in a variety of ways, and may include text information, images, audio, or video data to describe the event. Although FIGS. 15-18 illustrate notifications as pop-up windows on a display screen monitored by an event center operator, notifications are not limited to such embodiments. Alternatively, audio, text, and graphical notifications may be presented to any device capable of connecting to the event center server. For example, an event center operator may carry a mobile device which receives a custom text message notification whenever new event information appears in the event center server. Alternatively, notifications and event data may simply be logged into a data file at the event center for processing at a future time.

In reference to the graphical user interface illustrated in FIGS. 15-18, in certain embodiments, an operator may monitor this user interface on a display screen in the event center. Upon receiving a notification pop-up, indicating new event information, the operator may forward alerts based on the incoming information to the appropriate personnel. In alternative embodiments, this user interface may be implemented as an Internet application, originating from a server at the event center. In such embodiments, Internet clients may view this user interface and receive notifications directly by using their own computers or mobile devices to access the data at the event center. In yet another embodiment, this user interface may be displayed as part of a television broadcast, for example, during a weather forecast or breaking news alert.

While aspects and embodiments described in FIGS. 15-18 allow for interactive data retrieval from the event center, it should be recognized that the limitations of certain devices or data networks will prevent some users from taking advantage of certain interactive features of the user interface. For example, while a meteorologist employed by a television station may be able to manipulate the views and data displayed by the user interface, viewers watching the broadcast on TV will obviously not have the same control over the user interface. Similarly, certain mobile or handheld computers may lack the hardware infrastructure required to customize views and request specific data or specific events, whereas other personal computer user would be able to perform such tasks.

While FIGS. 15-18 show an embodiment which displays meteorological events on a weather map, the present invention is not limited to such uses. As discussed above, the present invention may be applied to more than just meteorological events. For example, the invention may be used to provide information regarding medical emergencies, natural disasters, traffic incidents, terrorist attacks, etc. Similarly, alternative embodiments do not require a display screen with a map, as is shown in FIGS. 15-18. For example, reported events may be presented in list form, and sorted by location, time, or priority. Events may also be reported using proprietary event notification software such as instant messenger, text messaging, email distribution lists, and the like. Alternatively, events might only be logged in the event center server, for subsequent data processing.

Figure 15:
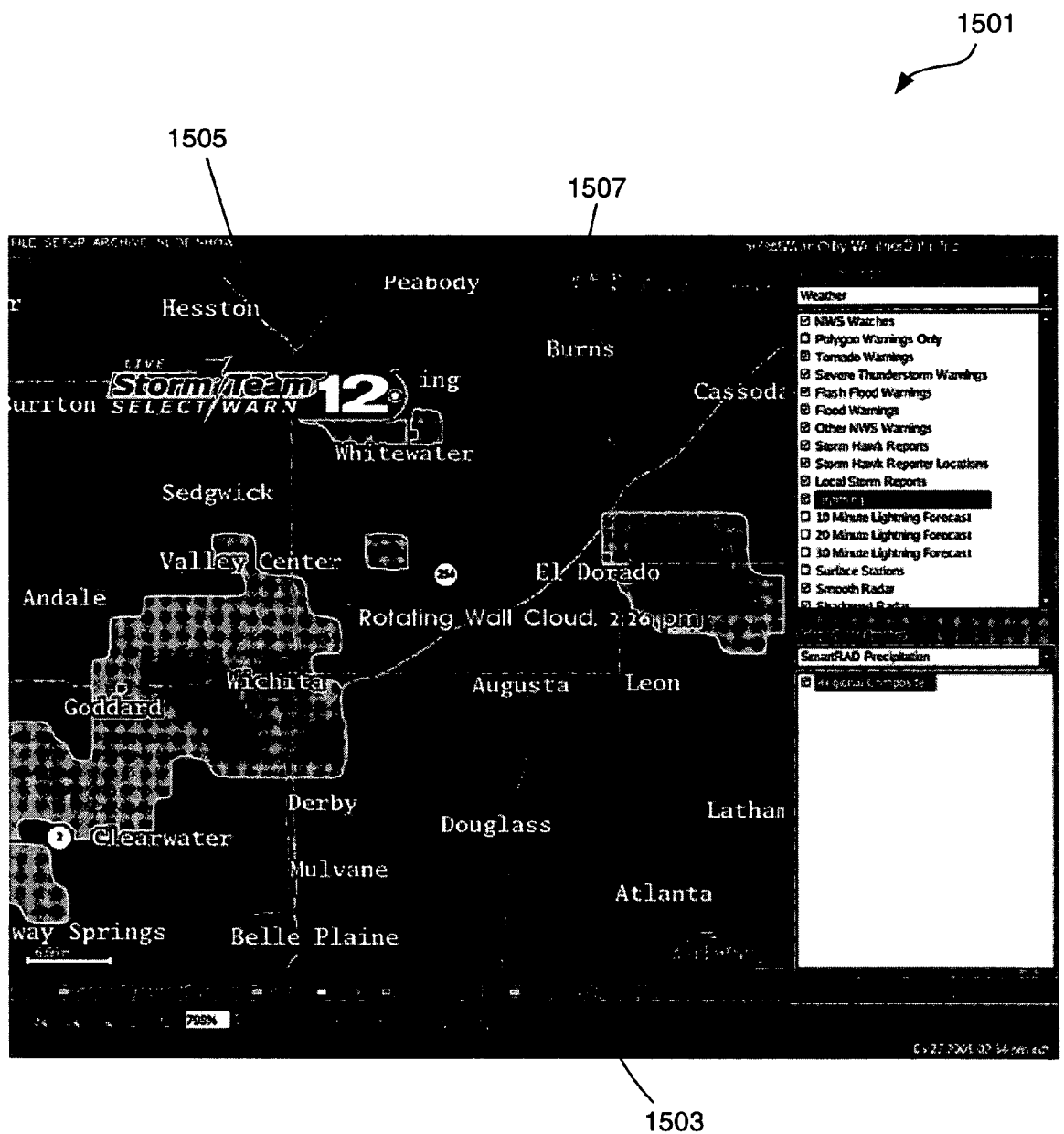
FIGS. 15, 16, 17, 18, 19, and 20 are screenshots of a graphical user interface display screen for a weather tracking application according to one or more illustrative embodiments of the invention.

Turning now to FIG. 15, a mobile computing device (e.g. a personal digital assistant, smartphone, mobile telephone, etc.) has recently transmitted data to the event center server reporting a meteorological hazard. In this case, a rotating wall cloud, indicative of a possible tornado, has been spotted by the device user, and a notification pop-up now appears in the user interface 1501. The display screen shows a point 1505 on a map 1503, indicating the location of the hazard. Additionally, a brief description of the hazard and the time that the hazard was reported 1507 are displayed next to the point 1505 marking the location of the hazard. In some embodiments, as in FIG. 15, the event description and reported time are displayed in a different color and font size from other labeled items on the map, making them easily visible to the user. Similarly, a point marking the location of an event may be a different size and color than the other points on the map. In certain additional embodiments, the color of the point 1505 depends on the existence of additional available information describing the event or hazard. For example, if the notification of the meteorological hazard contains a black dot at the location point 1505, then no additional data is available regarding that hazard; only the location, time, and a brief description have been reported to the event center. However, a red dot at the hazard location point 1505 indicates that the event center has additional information regarding this hazard. In one embodiment, the user may click either the point 1505 or the event description 1507 to view this additional information about the event or hazard.

Figure 16:
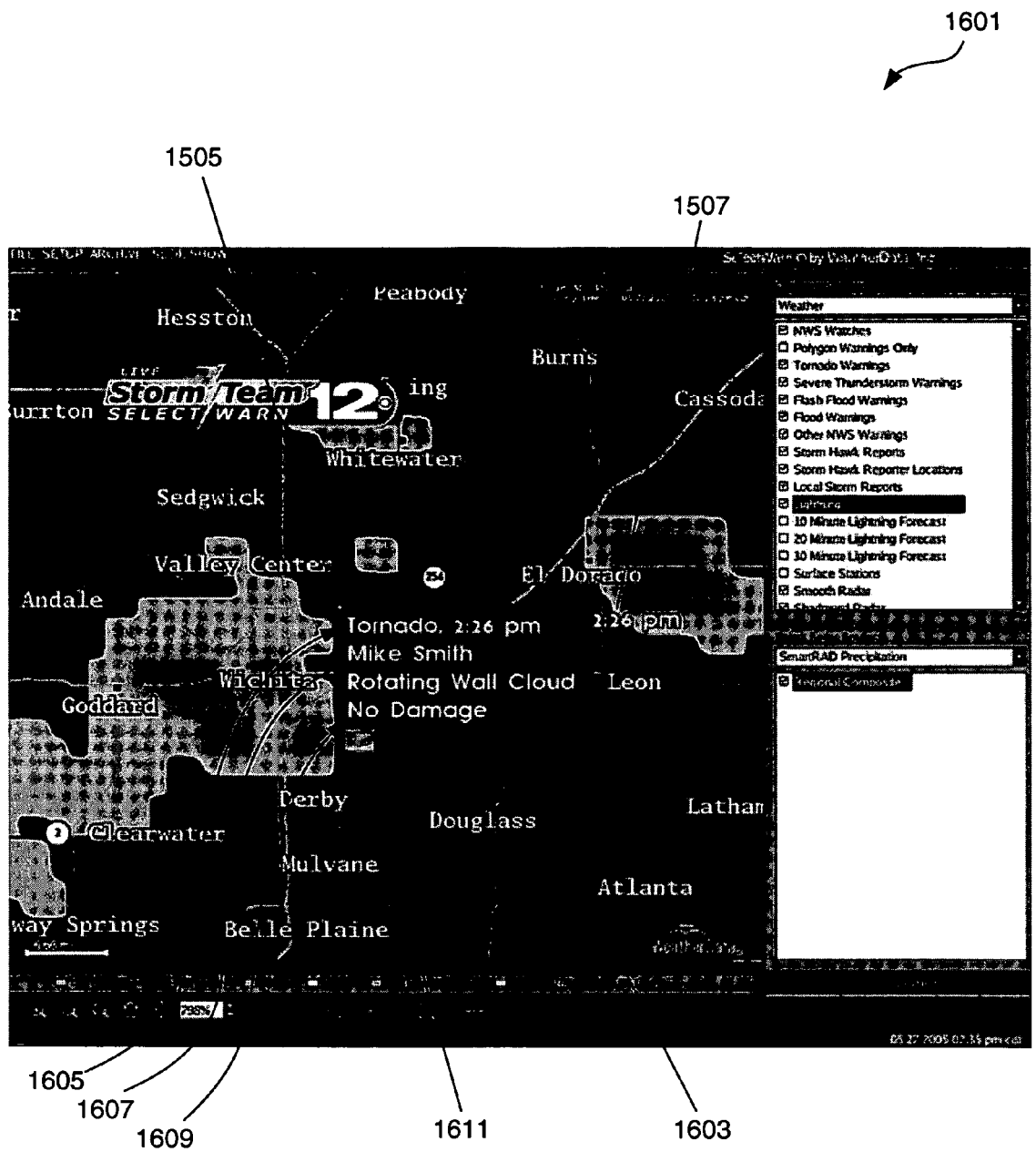

In FIG. 16, the user has observed that the event center contains additional information about the recently spotted rotating wall cloud, and has clicked on the event location

1505 or event description 1507, as shown in FIG. 15. The user interface display screen 1601, now shows a small notification window 1603, which displays the additional available information regarding the hazard. The event type 1605 (i.e., Tornado), the identity of the spotter 1607 (i.e., Mike Smith), and the damaged caused thus far by the hazard 1609 (i.e., No Damage) are displayed in the notification window 1603. The information displayed in the notification window 1603 will, of course, vary depending on the amount and type of information reported by the spotter, and on the type of the event or hazard. In one embodiment, a scroll bar dynamically appears in the window 1603 when the information available regarding the event does not fit into a single window.

Also contained in the notification window 1603 is a thumbnail image 1611 of the event. This thumbnail indicates to the user that the spotter has taken a digital picture of the rotating wall cloud and transmitted the image to the event center. With recent developments in technology, many common mobile devices also function as digital cameras, video cameras, or audio recorders. Other mobile devices may have the capacity to record external temperature, barometric pressure, air quality, wind speed, ground vibration, and almost any other measurable condition that a human might observe. Thus, while the invention is presently described in relation to digital images, it is not limited as such. For example, any of the sensory data described above, including sounds, pictures, videos, and any other recordable information, may be transmitted by the mobile user, stored in the event center, and displayed by the user interface.

Figure 17:
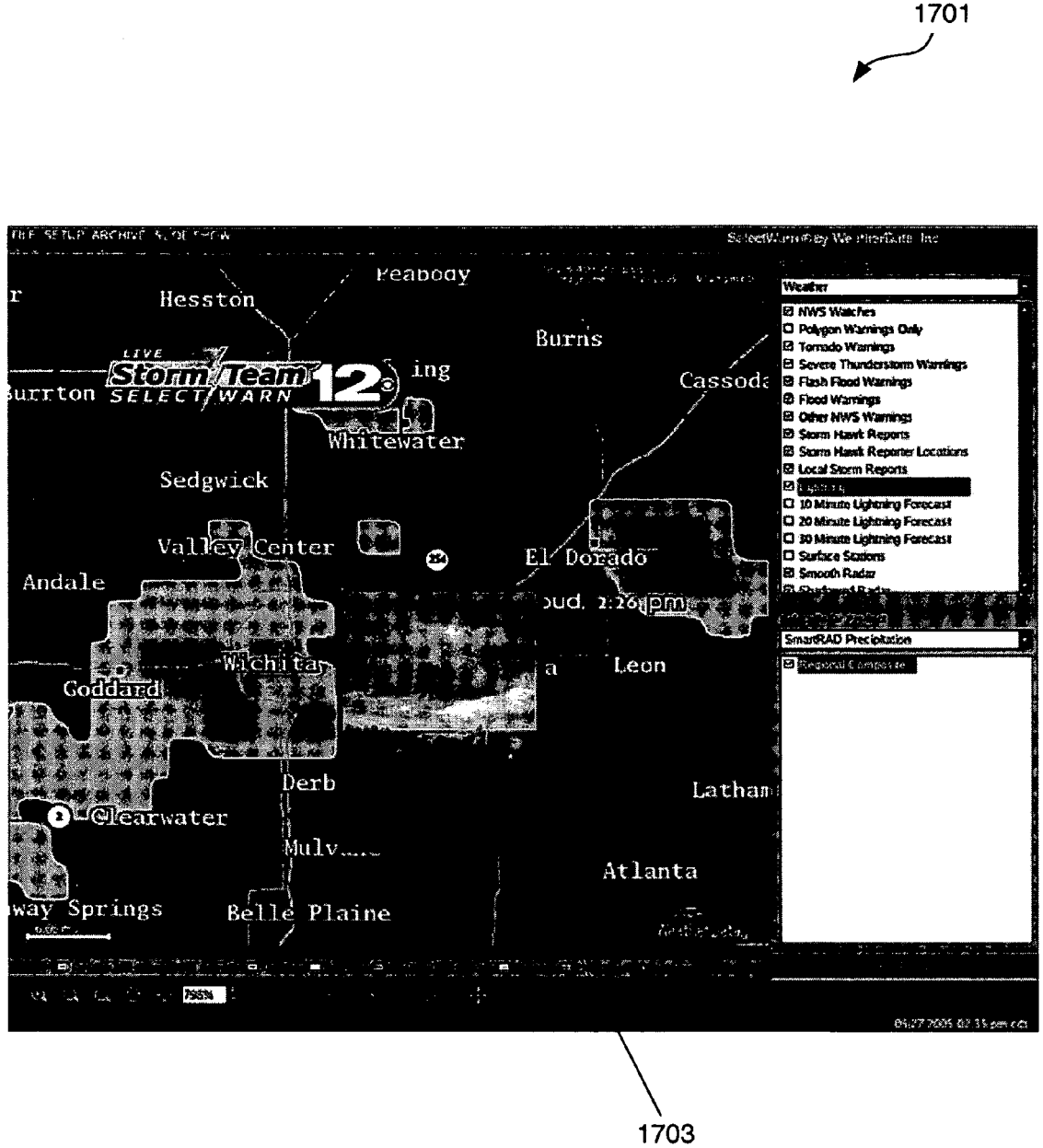

In FIG. 17, the user has clicked on the thumbnail image 1611 of FIG. 16. In response, the user interface display screen 1701 has maximized the image 1703. That is, the notification on the display screen 1701 now illustrates a full-sized high quality image, and all other information regarding this event has been hidden. In this view, the user can observe, in as much detail as possible, that which the mobile unit user observed. As stated above, these observations are not limited to images, but may be video, audio, or any other type of measurable sensory data.

Figure 18:
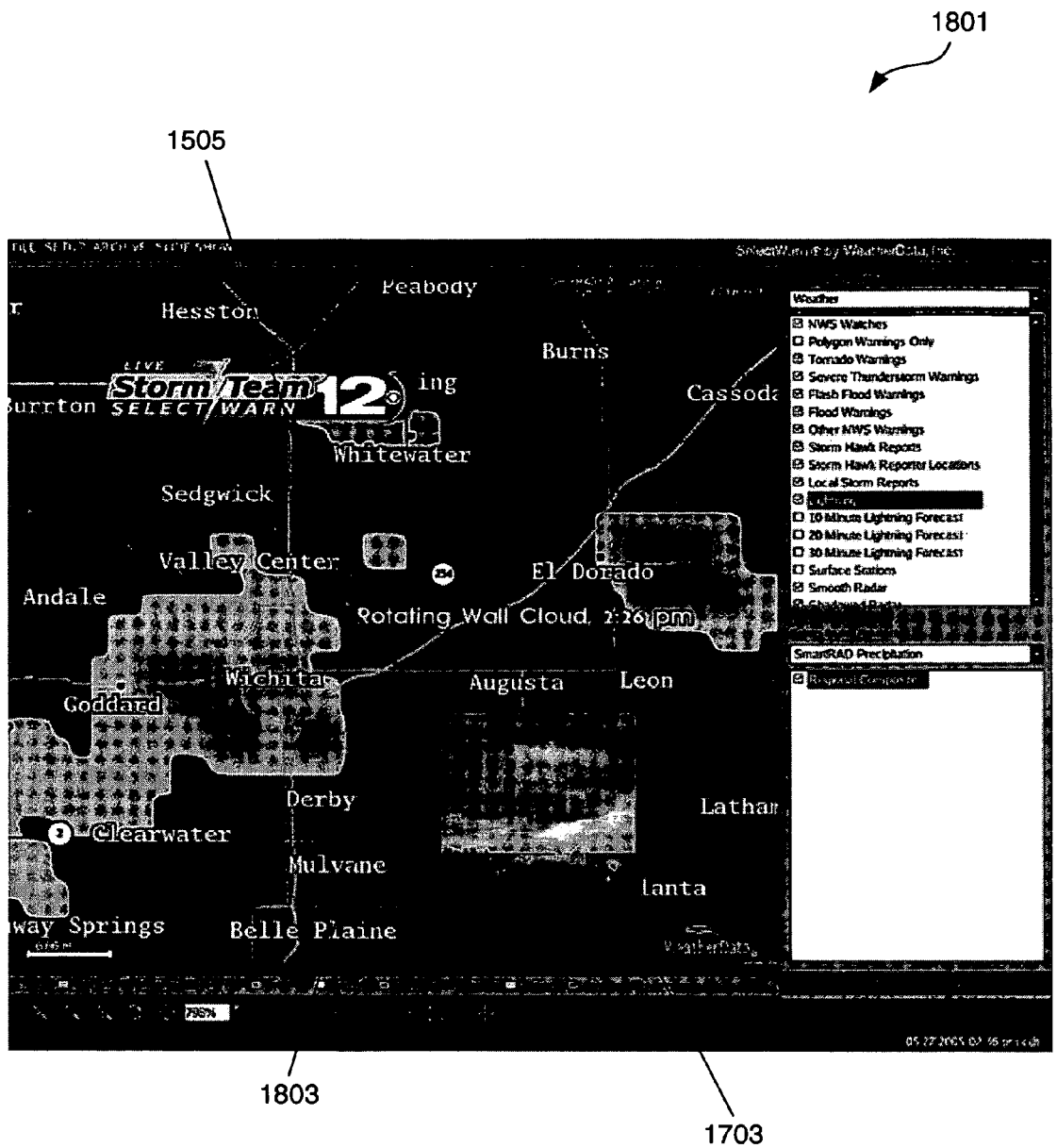

In FIG. 18, the user has manipulated the display screen 1801, moving the notification, consisting of the transmitted event image 1703, away from the location of the event 1503. A graphical user interface "rubber-band" connector 1803, now appears on the display screen 1801, connecting the notification to its corresponding location 1505. Using this aspect of the invention, the user may freely move the notification around the screen 1801, without the danger of forgetting where the event was spotted. For example, as shown in FIG. 18, a meteorologist may find it useful to observe the image of the rotating wall cloud 1703 and the weather radar map of the surrounding area in the same display view. If the meteorologist subsequently moves the image notification 1703 to a different location on the display screen 1801, the rubber-band connector 1803 will move with the image 1703. Thus, the user has the flexibility to customize the display screen 1801, by positioning the notification on the display screen and selecting the preferred notification view (e.g., brief description only, full-size image, thumbnail view with data, etc.).

The inventive system, including the mobile device(s) from which reports can be sent, in conjunction with the event center server with network access, provides routine, non-incident public safety and medical information collection and dissemination to appropriate personnel. The event center server may optionally provide a geographically specific map (e.g., a street-level map) illustrating the locations of all related parties to an event as determined by a particular subscriber to the event center. E.g., if a remote user reports a medical emergency, and the emergency response personnel are equipped with location aware devices (e.g., GPS) that report the location of the emergency response personnel back to the event center, the event center may track the location of the emergency response personnel and the injured person's location on the map, and may report the location and ETA of the emergency response personnel to the mobile device from which the medical emergency report was received.

The event center server may also provide, or be linked to another database that can provide, information regarding known risk factors for the reporting party (e.g., a subscriber is known to be allergic to codeine) and/or the incident location (e.g., the location is accessible only by dirt road). The event center may also communicate with other computers, databases, and/or electronic devices to obtain configuration, diagnostic, and/or repair information based on the event type and/or secondary information received, and optionally transmit the information back to the mobile device from which the event information and secondary information is received.

As an example, emergency medical technicians (EMTs) may respond in an ambulance to a 911 call or other reported medical emergency. The EMTs could report the event type and secondary information regarding the medical emergency to the event center as described above. In addition, it may be desirable for the EMTs to transmit more complex medical data using the mobile device. For example, EMTs may be unable to interpret electrocardiogram (EKG) and electroencephalogram (EEG) readouts taken at the scene. However, a doctor or specialist at a nearby hospital could receive images or other information pertaining to this medical data and properly diagnose the patient before the ambulance reaches the hospital.

Figure 19:
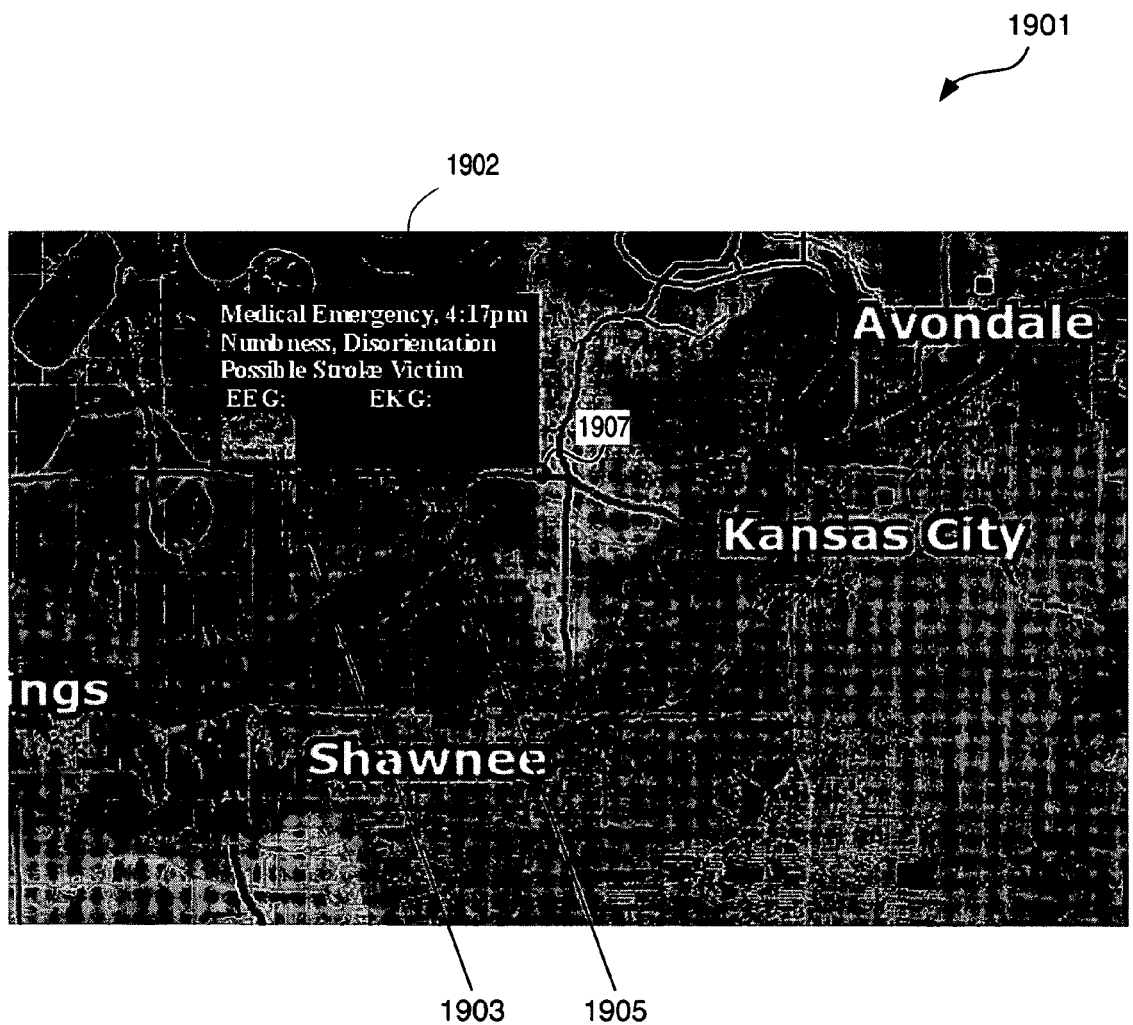

In FIG. 19, EMTs responding to a medical emergency are treating a patient who is experiencing disorientation and numbness. Knowing that these symptoms may indicate that the patient has suffered a stroke, the EMTs perform EKG and EEG tests on the patient. The EKG and EEG machines transfer the test results, either using a data cable or short-range wireless data transfer technology, to the mobile device. The mobile device can then send this data as an image, video, or other data type, to the event center. The event center operator can observe a medical emergency notification pop-up 1902 that appears on the user interface display screen 1901. The emergency is briefly described in the notification 1902, and its location is indicated by a dot 1907 on the map. Along with the description, the thumbnail images 1903 and 1905 indicate that the on-scene medical personnel have performed EEG and EKG tests, and the results have been uploaded to the event center. These test results can now be viewed as images or video by a medical specialist at the event center, or transferred to nearby hospitals for diagnosis and triage of the patient. Where an event center server is located at a hospital, the hospital personnel may immediately begin reviewing the patient's medical information.

Figure 20:
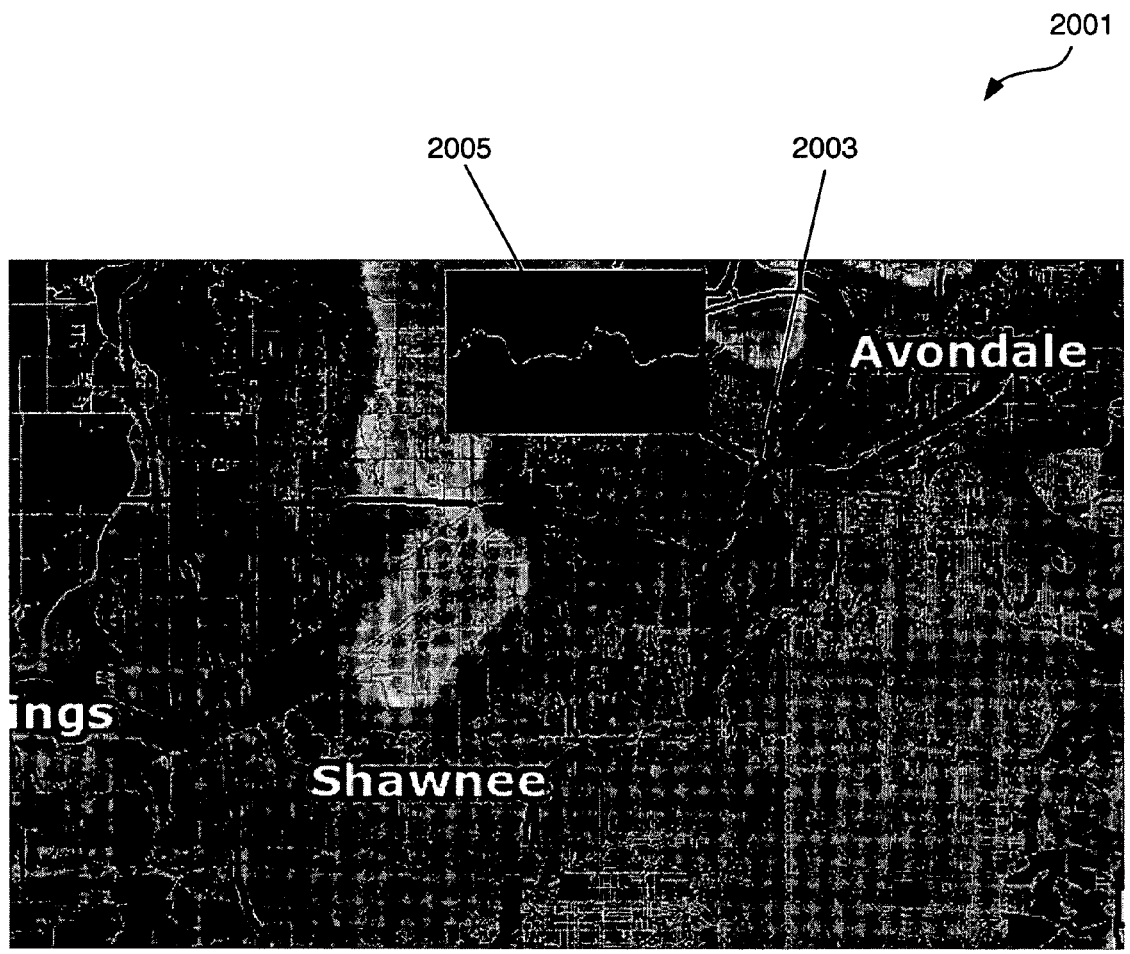

In FIG. 20, the progress of the ambulance is being tracked and displayed on the user interface display screen 2001. The ambulance is designated by a dot 2003, and the patient's updated medical data is displayed in the notification pop-up 2005. In the example shown, the patient's EKG readout, which is being continually monitored in the ambulance en-route to the hospital, is also being uploaded to the event center and displayed in the notification pop-up 2005 as a digital video recording (other data types are also possible)

The embodiments illustrated in FIGS. 19 and 20 show that the present invention can facilitate better and timelier medical care in emergency situations. Medical data sent through the mobile device can be combined with location data to allow more informed decisions regarding choice of hospital and choice of en-route treatment. The event center can make the latest medical data available to multiple nearby hospitals. Hospital personnel can coordinate based on the specialized treatment facilities, the on-duty staff, and the current patient load at each hospital, to select the optimal hospital for the patient's needs. Additionally, the destination hospital can monitor the location of the approaching ambulance with the GPS tracking in the mobile unit, and can receive updated en-route medical data, thereby enabling the hospital to provide the appropriate treatment promptly upon the patient's arrival.

In another aspect of the present invention, the event center may communicate with other computers or databases to pinpoint the location of a reported event. For instance, suppose a mobile device user sees a distant lightning strike and observes that a small forest fire has resulted from the strike. Using the embodiments described above, she reports this event to the event center, including her estimate of the location of the lightning strike. However, if she is several miles from the event, this reported location may be some distance from the actual location of the lightning strike and resulting forest fire. In one embodiment, the event center can corroborate the occurrence of the event and pinpoint the event location, by accessing a meteorological database which contains the time and precise location of all recent lightning strikes in the area. First, the event center uses the information in this database to confirm the validity of the mobile user's report, by confirming an actual lightning strike in the approximate place and time as the reported strike. Then, the event center can update the exact location of the lightning strike and forest fire, using the data from the meteorological database.

Another example will further illustrate this aspect of the invention. A driver observes a highway traffic accident, and, seeing that no one was injured in the accident, he decides not to stop. Nevertheless, the driver wishes to report this accident, as a likely traffic delay, to the event center. However, by the time the driver enters and transmits his report, he and his car may be a mile or more down the road. In this case, the event center may access a street-level GPS map to compute the actual location of the accident based on the driver's current location, speed, and time entered for the accident. If the road is straight, then the street-level GPS map may only be useful to determine the highway name and cross-street or mile marker of the accident. However, if the section of road between the driver's current position and the accident has any turns, then the exact location of the accident might not be calculated accurately from the driver's location, orientation, and speed. In that case, the event center can use the street-level GPS map to pinpoint an exact location for the accident. The event center would first identify the road that the driver is currently on, then back-track on that road the appropriate distance to determine the location of the accident.

In an alternative embodiment of the invention, the mobile device user may spot an event and set the mobile device into reporter mode, in preparation to enter the event type and secondary information. Once the user sets the mobile device into reporter mode, the reported location of the device is 'frozen,' or unchanged until after the event is sent. While the physical device continues to move (e.g., in a car, airplane, or other means of transportation), the location reported to the event center will be the location of the mobile device when reporter mode was engaged. This aspect of the invention allows for more accurate event location reporting. An observer might be a considerable distance past event before inputting the event information into the mobile device and sending it to the event center. In this embodiment, without any additional effort from the mobile device user, the most accurate known location for the event is preserved in the mobile device and reported. In certain embodiments, reporter mode may be automatically engaged when the user takes a digital photograph, or records sound or digital video with the device. In other embodiments, reporter mode is engaged when the user initiates the event reporting software on the mobile device.

Given that the system described herein provides meteorological warnings as well as receives event reporting information, the event center server may mediate between responders, on-scene systems and meteorological databases to provide location-based prospective and historical weather conditions, e.g., conditions at the time the event was reported, believed to have occurred, and/or for the expected duration of the incident or the response thereto.

The event center may also be used for subsidiary operations such as tracking consumables inventory (e.g., drugs administered on-scene at a reported event), and tracking durable equipment inventory, maintenance, and repair.

As indicated above, authorized users or subscribers can access any and/or all information stored in the event center server or servers, either directly from within the event center or remotely via a network connection such as through the Internet. In addition, the event center server notifies applicable personnel, e.g., based on the type of event and/or the location of the event. That is, if a medical event occurs within the jurisdiction of Smith County, the event center may notify the Smith County Police and Smith County Paramedics. However, if the event occurs at the Kansas Speedway, the event center may also or alternatively notify the Kansas Speedway operations center because Kansas Speedway operates its own medical response unit and has hospital facilities on-site. The personnel, company, group, agency, etc., to notify may be stored in a lookup table, database, or the like in the event center server, and may be based on event type, event location, or any other information (including secondary information) received from a mobile device.

Custom Warnings

According to an aspect of the invention, a subscriber may be a television station or a meteorologist employed by a television station, and updated meteorological information may be automatically sent to a computer used by the meteorologist or at the location of the television station. The meteorologist may want to display information, referred to as a "crawl", over a television program being broadcast by the television station, based on the received meteorological information. The crawl displays text moving from right to left on the top or bottom of a television screen. However, if the meteorologist is not present, viewers might not receive a crawl warning that they otherwise would if the meteorologist were present when the warning arrived from the event center. Thus, the event center (or alternatively the subscriber's computer with applicable control logic or software) may automatically generate crawl text for broadcast over a television program. When the meteorologist subscriber's computer receives or generates the automated crawl text, the crawl information is sent to a broadcast computer for mixing with the television signal, such that the broadcast television signal includes the crawl text moving across the screen.

Figure 11:
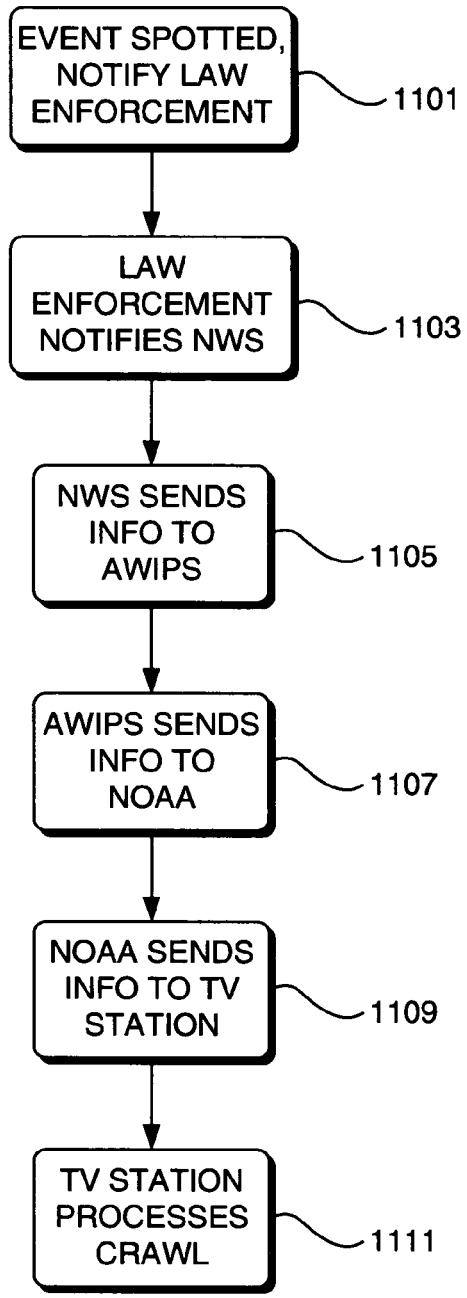
FIG. 11 illustrates a conventional crawl generation method.

FIG. 11 illustrates a conventional method for generating a crawl for display over a television broadcast. In a typical scenario, in step 1101, a tornado or some other event is spotted by a storm chaser or other individual near the location of the tornado, and the individual notifies a law enforcement agency, e.g., by calling 911 or the police. In step 1103, the law enforcement agency notifies the National Weather Service. In step 1105, the NWS manually sends the information to the Advanced Weather Interactive Processing System (AWIPS) of the NWS (that is, they type it). In step 1107, an AWIPS administrator types in information regarding the tornado or other event and sends the information to the National Oceanic and Atmospheric Administration (NOAA) Weather Wire (NWWR) and other dissemination channels. In step 1109, the NWWR sends a notification to a television station. In step 1111, the television station processes the notification by manually entering crawl text based on the notification, and airs the crawl for broadcast. The amount of time from initial sighting in step 1101 to display in step 1111 usually takes approximately 5 to 30 minutes.

Figure 12:
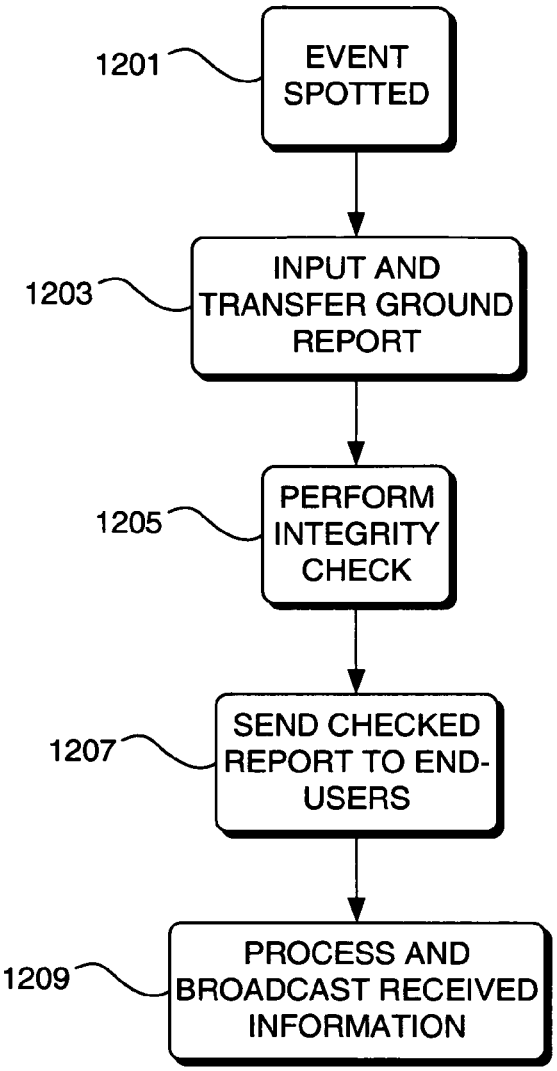
FIG. 12 illustrates a method for generating information for broadcast via television according to an illustrative embodiment of the invention.

FIG. 12 illustrates a method for generating television display information according to an illustrative aspect of the invention. In step 1201, a storm chaser or other individual equipped with a mobile device as described herein witnesses a tornado or other hazardous or life-threatening event. In step 1203, the user inputs information about the event into the mobile device, which wirelessly transmits the information as a "ground truth" report to a event center. In step 1205, the event center performs a quality control integrity check on the received "ground truth" report, either by manually comparing the received report to presently known conditions for the applicable area, or by using automated computer algorithms to do so. In step 1207, the event center sends the quality controlled report to a device, such as a remote, mobile or vehicular device described herein (including, e.g., the device from which the report was received). The event center may also send email notifications or other reports to one or more devices or entities including, e.g., the NWS, news media, etc. The remote device may also include a computing device at a television station which, in step 1209, automatically processes the received quality controlled report for broadcast via television. The television broadcast might include not only a text crawl, but also a plotted weather report similar to that illustrated in FIG. 10. The amount of time from initial sighting in step 1201 to display in step 1209 takes less than one minute, and typically only requires about 30 seconds when the integrity check is performed automatically.

An advantage of the present invention is that crawl information can be automatically generated without human intervention, thus presenting crawls and other information to viewers in much less time than previously possible, thereby saving lives. In some embodiments, a user may be required to authorize or approve the automatically generated text, for example, a meteorologist may approve the crawl text regarding weather prior to its being sent over the broadcast TV signal. In another embodiment, the crawl may be sent automatically over the broadcast without requiring a user to approve or authorize the crawl. Another advantage of the present invention is that, because the remote device from which a ground truth report is received may be GPS-enabled, location information is inherently trustworthy. Whereas in previous solutions, manual data entry errors often resulted in misidentifying the location of meteorological events.

Using the above-described system, a user is not required to type the text of the crawl into a computer because the weather center or client computer can generate the crawl automatically based on the location of the client computer, or based on some other predetermined location (e.g., the viewing area of the television station). The event center or subscriber computer may store a database of text information indicative of common words and phrases used in warnings, e.g., times, locations, hazard types, and the like. When a warning is received that should be provided to television viewers, the event center or subscriber computer automatically generates a crawl message using the stored words and phrases in the database, e.g., "A thunderstorm watch is in effect for Washington County until 9:30 PM.", based on the content of the hazard warning information received from the event center. Alternatively, crawls can also be manually typed into a Chyron or other messaging system at the television station.

Figure 13:
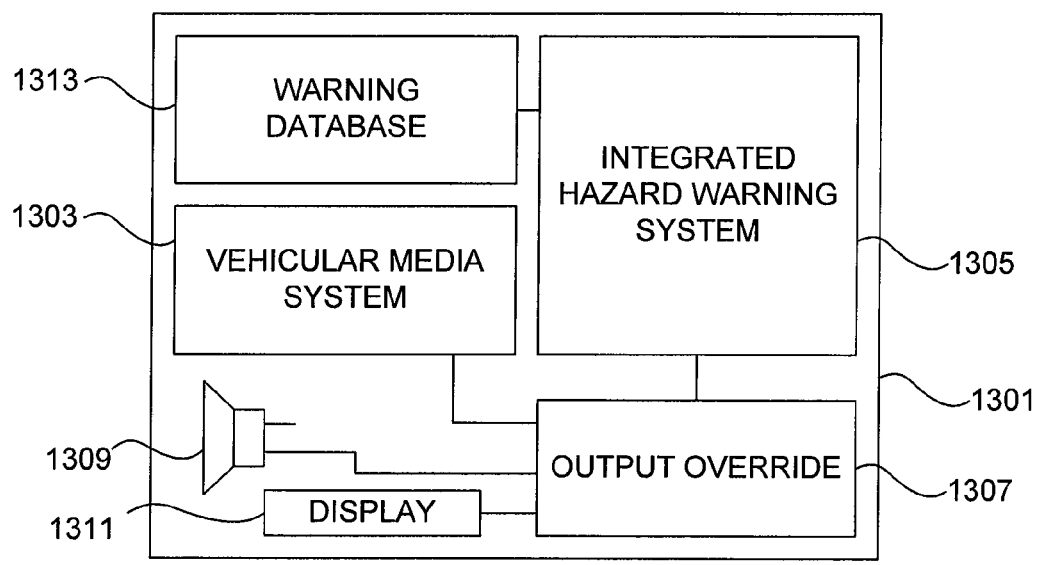
FIG. 13 illustrates a block diagram of a vehicular media system with an integrated hazard warning system, according to an illustrative embodiment of the invention.

According to another aspect of the invention, audio warnings may be automatically generated and spoken back to a user of a mobile warning device. For example, with reference to FIG. 13, a hazard warning system 1305 as described herein may be integrated in a vehicular media system 1303, e.g., AM, FM, or satellite radio receiver, CD/DVD player, digital music player, navigation system, or the like, so that the vehicle has one combined information and media display system 1301. The vehicular media system 1303 and hazard warning system 1305 may both be connected to an output override circuit 1307. The output override circuit, by default, passes information received from the vehicular media system 1303 to the audio and video output devices, e.g., speaker(s) 1309 and visual display 1311. However, when a warning is receive or detected by hazard warning system 1305, the output override circuit may mute or lower the volume of the vehicular media system 1303 and output audio information from hazard warning system 1305 via speaker 1309. In addition, output override circuit 1307 may overlay information received from hazard warning system 1105 on top of other information already displayed on visual display 1311.

Hazard warning system 1305 may be connected to warning database 1313 that stores audio clips that may be combined to provide customized audio warnings to a driver of the vehicle so that the driver does not need to divert his or her attention from the road to read information on the visual display. Warning database may store pre-recorded audio clips that hazard warning system 1305 combines and plays to provide the proper warning. E.g., hazard warning system 1305 might combine the recorded audio clips "hail," "is," "detected," "five," "miles," "ahead," "and," "is expected to last," "until," "four," and "PM" to inform the user that the system, on its present route of travel, is predicted to encounter hail in five miles and the hail will last until 4 PM. In an alternative embodiment, the warning database stores text strings which, after combined, are read back by a text-to-speech processor in the hazard warning system 1305.

Any of the methods of the invention can be implemented in control logic, e.g., software, that can be stored on computer disks or other computer-readable media for execution in a computer or other data processing device. The invention can be implemented using web browser technology, handheld computing units, and/or cellular telephones in addition to or instead of being integrated into a vehicular system. Moreover, the invention has wide application for various types of weather hazards including lightning, hail, hurricanes, wind shear, and the like, and the inventive principles can be applied equivalently to such phenomena, as well as to natural and man-made hazards, disasters, and life-threatening events. No claim should be interpreted to be in means plus function format. Numbered steps in method claims should not be interpreted to require a particular ordering of the steps, unless the claim expressly requires such ordering. What has been described above is merely illustrative of the application of the principles of the present invention. Other arrangements and methods can be implemented by those skilled in the art without departing from the spirit and scope of the present invention.

I claim:

1. A method for providing information regarding an observed event, comprising:
   (a) receiving from a mobile data processing device, computer readable data comprising information corresponding to an event observed by a user of the mobile data processing device, wherein said computer readable data includes an event type and an event location based on a location of the mobile data processing device, and wherein said computer readable data includes sensory data recorded proximately to the event; and
   (b) displaying on a display device a notification based on the received computer readable data.

2. The method of claim 1, wherein said sensory data comprises an image.

3. The method of claim 2, wherein said step (b) comprises displaying the image on the display device.

4. The method of claim 1, wherein said sensory data comprises an audio recording.

5. The method of claim 4, wherein said step (b) comprises playing said audio recording via an audio speaker.

6. The method of claim 1, wherein said sensory data comprises a video recording.

7. The method of claim 6, wherein said step (b) comprises displaying the video recording on the display device.

8. The method of claim 1, wherein said sensory data comprises output from a medical monitoring device.

9. The method of claim 8, wherein said step (b) comprises displaying the medical data on the display device.

10. The method of claim 1, wherein step (b) comprises displaying a map on the display device, and displaying said notification at a point proximate to the point on the map corresponding to the location of the observed event.

11. The method of claim 10, wherein step (b) further comprises drawing a connector on the display device connecting said notification to said point on the map corresponding to the location of the observed event.

12. The method of claim 11, further comprising receiving user input to reposition said notification on the display device, and wherein said connector is redrawn to connect said repositioned notification to said point on the map corresponding to the location of the observed event.

13. The method of claim 1, wherein said notification includes an indication that said sensory data corresponding to the observed event has been received from a mobile data processing device.

14. The method of claim 1, wherein said notification includes a thumbnail image corresponding to said received data.

15. The method of claim 1, wherein said notification includes a button on the display device for informing the user that addition information corresponding to the observed event has been received from a mobile data processing device, said button being selectable to display the additional information.

16. The method of claim 1, wherein said received event location comprises the location of the mobile data processing device at such time when the user of the device first entered into the device an indication of an observed event.

17. A computer readable medium storing computer executable instructions for performing the method of claim 1.

18. An event notification system, comprising:
a database for storing information corresponding to an event;
memory storing computer executable instructions for performing a method of presenting a notification to a user of the system, said method comprising:
   receiving from a mobile data processing device, data comprising information corresponding to an event observed by a user of the mobile data processing device, wherein said data includes an event type, an event location based on a location of the mobile data processing device, and sensory data recorded proximately to the event; and
   outputting a notification based on said data for display on a display device.

19. The system of claim 18, wherein said sensory data comprises an image, and said notification comprises displaying the image on the display device.

20. The system of claim 18, wherein said sensory data comprises an audio recording, and said notification comprises playing the audio recording via an audio speaker.

21. The system of claim 18, wherein said sensory data comprises a video recording, and said notification comprises playing the video recording on the display device.

22. The system of claim 18, wherein the notification comprises a thumbnail image corresponding to said sensory data.

23. The system of claim 18, wherein the notification comprises a button for displaying additional information corresponding to the event.

24. The system of claim 18, wherein said notification is displayed superimposed on a map at a point proximate to the point on the map corresponding to the location of the event.

25. The system of claim 24, wherein the display device displays a connector connecting said notification to said point on the map corresponding to the location of the event.

26. The system of claim 25, wherein the computer executable instructions are further configured to:
   receive user input to reposition said notification on said display device;
   reposition said notification on the display device in response to said user input; and
   redraw said connector to connect said repositioned notification to said point on the map corresponding to the location of the event.

27. An event notification system, comprising:
a database for storing information corresponding to an event;
memory storing computer executable instructions for performing a method of presenting a notification to a user of the system, said method comprising:
   receiving data from a mobile device, the data comprising information corresponding to the event observed by the user of the mobile device, wherein the data comprises an event type of the event, an event location based on a location of the mobile device, and sensory data recorded proximately to the event, the sensory data being at least one of an image of the event, an audio recording of the event, and a video recording of the event;
   generating a notification based on the data;
   displaying a map on a display device, the map corresponding to the event location; and
   displaying the notification on the map, wherein displaying the notification displays the sensory data on the map.

28. The system of claim 27, wherein the notification is displayed on the map proximate to a point on the map corresponding to the event location.

29. The system of claim 27, wherein the memory stores further computer executable instructions for performing a method comprising:
   receiving user input to reposition the notification on the map; and displaying a connector on the map after repositioning of the notification to connect the notification to the point on the map corresponding to the event location.

30. A method comprising:

receiving data from a mobile device, the data comprising information corresponding to an event observed by a user of the mobile device, wherein the data includes an event type of the event, an event location based on a location of the mobile device, and sensory data recorded proximately to the event;

generating a notification based on the data;

displaying a map based on the event location at a display device;

displaying the notification within the map, wherein the display of the notification displays the event type and an indicator to indicate that the sensory data is available for display.

* * * * *